United States Patent
Hamaguchi

(10) Patent No.: US 9,628,657 B2
(45) Date of Patent: Apr. 18, 2017

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/692,616

(22) Filed: Apr. 21, 2015

(65) Prior Publication Data

US 2015/0312437 A1 Oct. 29, 2015

(30) Foreign Application Priority Data

Apr. 25, 2014 (JP) ................................. 2014-091808

(51) Int. Cl.
  *H04N 1/04* (2006.01)
  *G06K 15/00* (2006.01)
  *H04N 1/00* (2006.01)

(52) U.S. Cl.
  CPC ........... *H04N 1/04* (2013.01); *H04N 1/00798* (2013.01)

(58) Field of Classification Search
  CPC ...................... H04N 1/04; H04N 1/00798
  USPC ....... 358/488, 486, 497, 496, 437, 468, 403, 358/404, 444, 3.28, 1.14; 382/305, 306
  See application file for complete search history.

(56) References Cited

U.S. PATENT DOCUMENTS

| | | | | |
|---|---|---|---|---|
| 6,943,907 | B1 * | 9/2005 | Kim | G03G 15/502 358/1.13 |
| 7,375,861 | B2 * | 5/2008 | Lebo | H04N 1/00681 358/474 |
| 7,738,143 | B2 * | 6/2010 | Ishimoto | G03G 21/043 358/1.14 |
| 8,351,091 | B2 * | 1/2013 | Kojima | H04N 1/00222 358/1.15 |
| 8,610,974 | B2 * | 12/2013 | Takeuchi | 358/494 |
| 9,019,571 | B2 * | 4/2015 | Yamada | H04N 1/00408 358/403 |
| 2010/0060932 | A1 * | 3/2010 | Matsushita | H04N 1/387 358/1.15 |
| 2011/0292414 | A1 * | 12/2011 | Nagappan | H04N 1/00408 358/1.9 |

(Continued)

FOREIGN PATENT DOCUMENTS

JP S6026330 A 2/1985
JP 2000352916 A 12/2000

*Primary Examiner* — Cheukfan Lee
(74) *Attorney, Agent, or Firm* — Canon U.S.A., Inc. IP Division

(57) ABSTRACT

An image processing apparatus includes a first reading unit configured to generate image data by reading a document set between a document positioning plate and a document-positioning-plate cover, an output unit configured to output image data, a receiving unit configured to receive an execution instruction of a job for outputting, performed by the output unit, the image data generated by the first reading unit, and a control unit configured to control, in a case where a predetermined setting is set, the output unit not to perform output of the image data until it is determined that the document is to be removed from the document positioning plate, after the first reading unit has completed reading the document.

6 Claims, 19 Drawing Sheets

(56) References Cited

U.S. PATENT DOCUMENTS

2012/0162711 A1* 6/2012 Shibao ............... H04N 1/00217
358/1.15

* cited by examiner

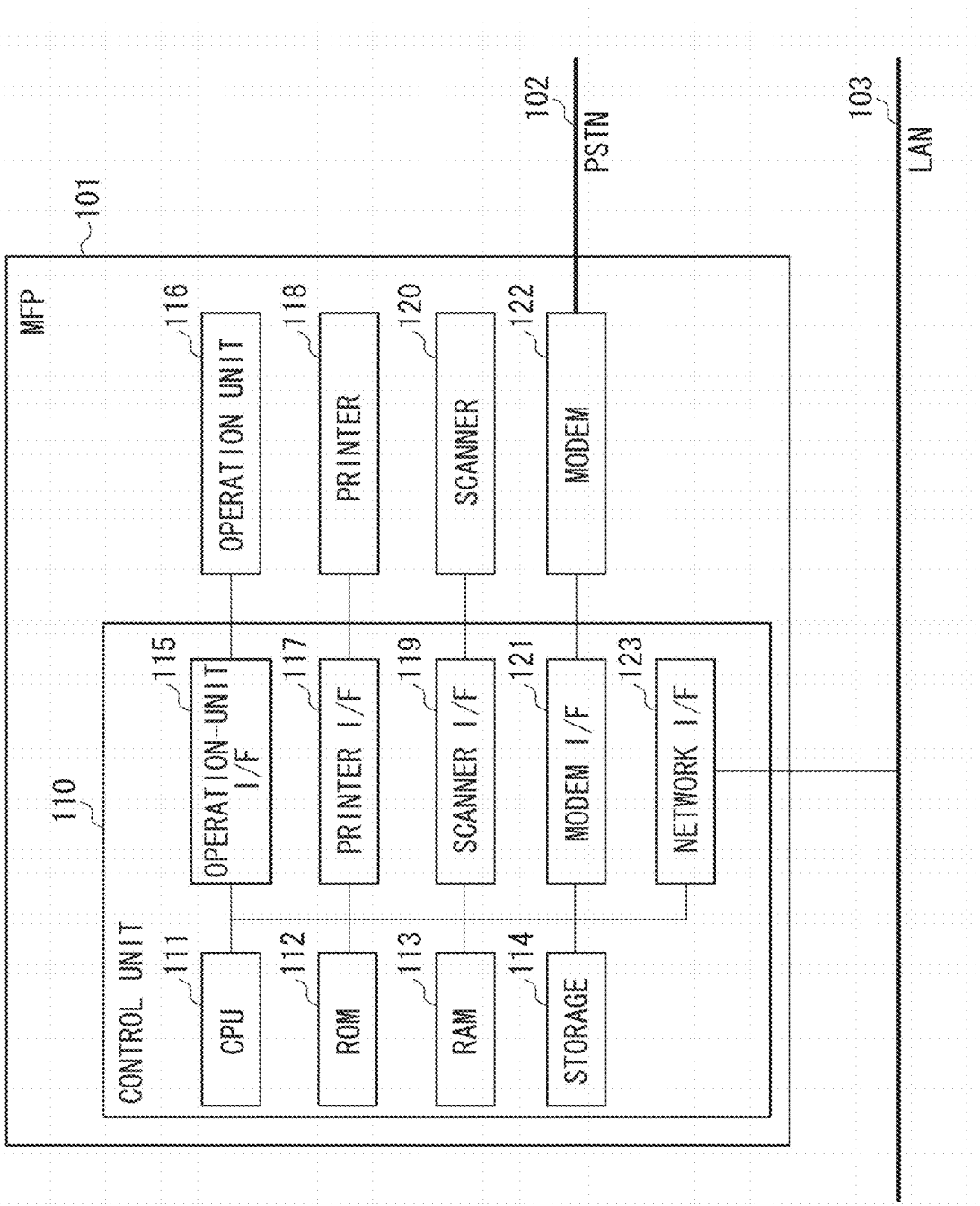

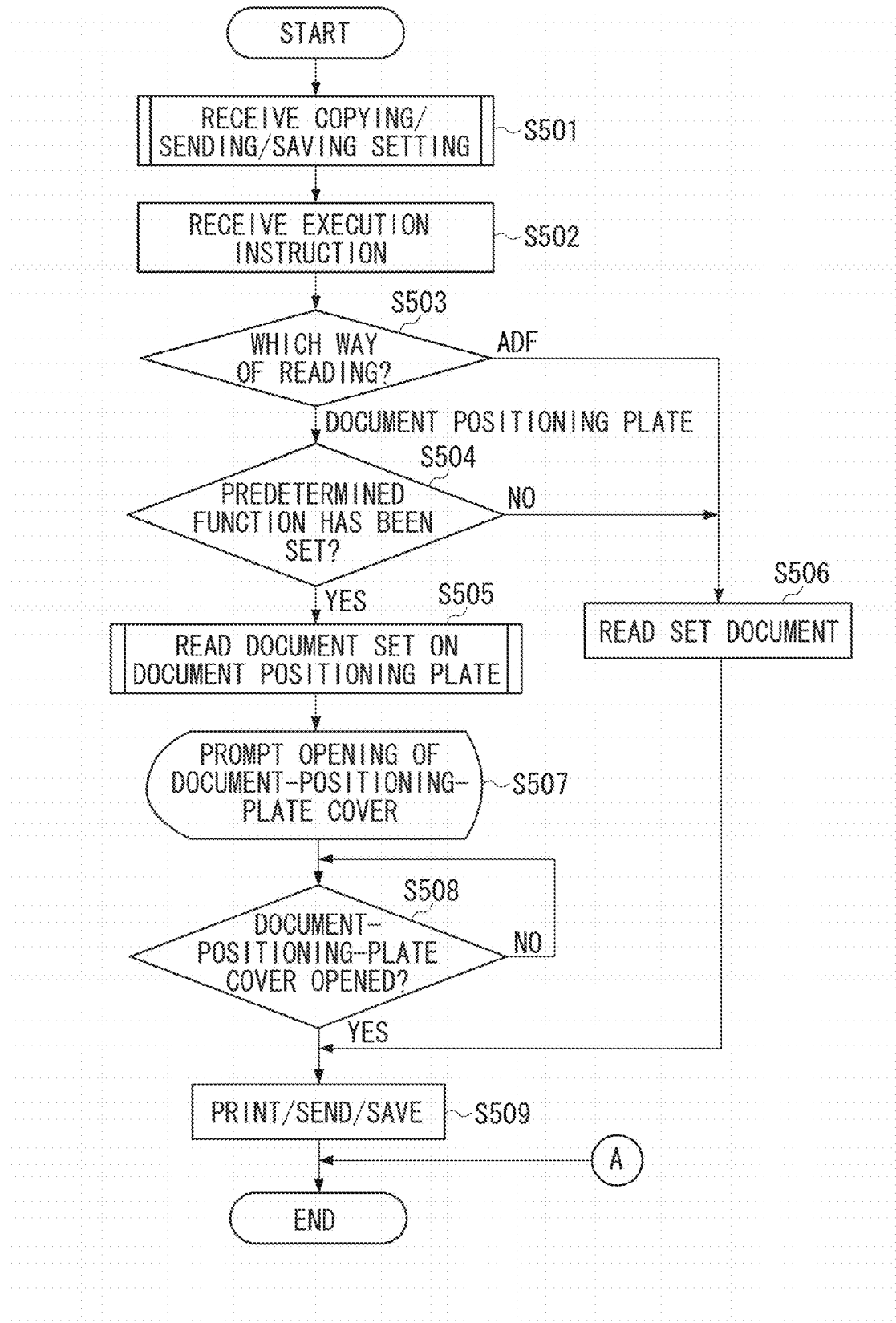

FIG. 6

| OUTPUT PROCESSING | SETTING | |
|---|---|---|
| COPYING | ID CARD COPY | 601 |
| COPYING | COPY-FORGERY-INHIBITED-PATTERN PRINTING | 602 |
| COPYING | SERIAL-NUMBER PRINTING | 603 |
| COPYING | STAMP PRINTING | 604 |
| COPYING | DIGITAL-WATERMARK PRINTING | 605 |
| COPYING | BAR-CODE-PATTERN PRINTING | 606 |
| SENDING | CONFIDENTIAL FAX | 607 |
| SENDING | ELECTRONIC SIGNATURE | 608 |
| SENDING | TIME STAMP | 609 |
| SENDING OR SAVING | PDF FILE WITH ENCRYPTION PASSWORD | 610 |

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present invention relates to an image processing apparatus that generates image data by reading a document and processes the generated data. The present invention also relates to a control method for the image processing apparatus, and a storage medium.

Description of the Related Art

There is one type of image processing apparatus that can print, send, and store generated image data by reading a document set between a document positioning plate (a document placing platen) and a document-positioning-plate cover. When using this image processing apparatus, a user sets output processing, such as copying and sending, and also sets details (e.g., the number of copies and a transmission destination) of this processing, by using an operation unit. The user then provides an instruction to start job execution. Upon receiving the instruction to start the job execution, the image processing apparatus starts reading of a document, and performs the output processing upon completion of the reading.

Such an image processing apparatus reads the document in a state where the document-positioning-plate cover is closed. When reading of the document is completed and the output processing is executed, the user tends to pay attention to an output result, such as a print product. In this situation, the user is likely to forget about collecting the document, thereby leaving behind the document between the document positioning plate and the document-positioning-plate cover.

To address this issue, for example, Japanese Patent Application Laid-Open No. 60-26330 discusses a technique in which a mechanism, such as a sensor detecting a document, is added to an image processing apparatus to detect a document being left behind and to warn a user by using a blinking lamp or a buzzer. Japanese Patent Application Laid-Open No. 2000-352916 also discusses an image processing apparatus that detects a state where a document is removed, by a sensor detecting a document. A print operation starts only after removal of the document is detected by the sensor.

In the Japanese Patent Application Laid-Open No. 2000-352916, the print operation starts after detecting removal of a document from a document feeding unit or a document positioning plate. Therefore, unless the user removes the document, the user cannot have a print product, which can prevent the document from being left behind.

In a case of reading an identification card, such as a driver's license and a health insurance card, for identification of a person, the identification card is likely to be lost when being left behind. Therefore, the need for preventing a document from being left behind is greater. Further, there is an image processing apparatus that includes setting for stamp printing to be used when printing or copying is performed from the viewpoint of confidentiality preservation. This setting is provided to print a document with a character sequence or a pattern, such as CLASSIFIED and CONFIDENTIAL in a superimposed manner. In such a case, i.e., when a copy job set to prevent leakage of confidential information is executed, leakage of the confidential information may occur if a document is left behind. Therefore, it is necessary to prevent a document from being left behind.

However, in any situation, if output processing is inhibited from starting until removal of a document is detected, the output processing is likely to become slow, which causes reducing of user convenience.

SUMMARY OF THE INVENTION

The present invention is directed to a mechanism for performing control for appropriately preventing a document from being left behind, according to whether predetermined setting is performed.

According to an aspect of the present invention, an image processing apparatus includes a first reading unit configured to generate image data by reading a document set between a document positioning plate and a document-positioning-plate cover, an output unit configured to output image data, a receiving unit configured to receive an execution instruction of a job for outputting, performed by the output unit, the image data generated by the first reading unit, and a control unit configured to control, in a case where a predetermined setting is set, the output unit not to perform output of the image data until it is determined that the document is to be removed from the document positioning plate, after the first reading unit has completed reading the document.

Further features of the present invention will become apparent from the following description of exemplary embodiments (with reference to the attached drawings).

BRIEF DESCRIPTION OF THE DRAWINGS

FIG. 1 is a block diagram illustrating a hardware configuration of a multifunction peripheral (MFP) according to an exemplary embodiment of the present invention.

FIG. 5 is a flowchart illustrating a printing, sending, or saving operation of the MFP according to the exemplary embodiment of the present invention.

FIG. 6 is a diagram illustrating an outline of processing conditions according to the exemplary embodiment of the present invention.

DESCRIPTION OF THE EMBODIMENTS

Figure 2A:
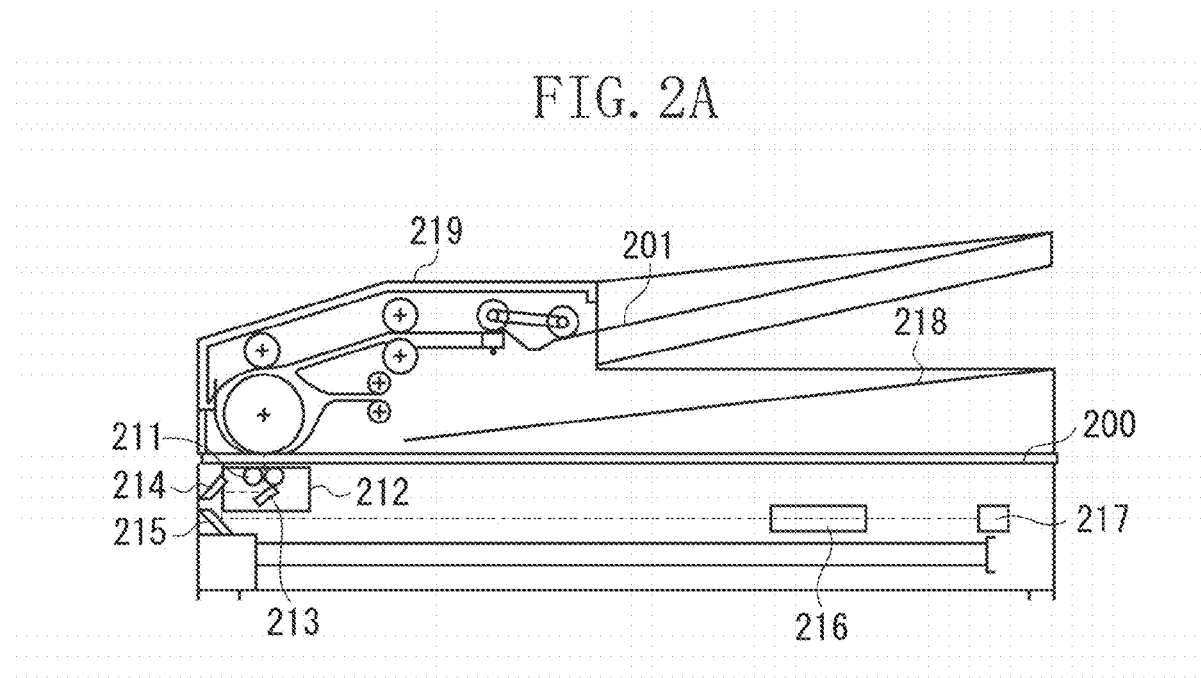
FIGS. 2A and 2B are diagrams each illustrating an appearance of a scanner according to the exemplary embodiment of the present invention.

Exemplary embodiments of the present invention will be described in detail below with reference to the drawings. The following exemplary embodiments are not intended to limit the invention according to the scope of claims. Any combinations of features described in the exemplary embodiments are not necessarily essential to a solution unit of the invention.

A first exemplary embodiment of the present invention will be described. FIG. 1 is a block diagram illustrating a hardware configuration of a multifunction peripheral (MFP) 101. The MFP 101 is an example of an image processing apparatus. The present exemplary embodiment will be described by taking an MFP as an example of the image processing apparatus. However, any type of apparatus other than the MFP, such as a scanner apparatus having a single function, may be adopted as long as the apparatus has a function for generating image data by reading a document placed on a document positioning plate.

A control unit 110 includes a central processing unit (CPU) 111, and controls operations of the entire MFP 101. The CPU 111 performs various kinds of control, such as reading control and print control, by reading a control program stored in a read only memory (ROM) 112 or a storage 114. A random access memory (RAM) 113 is a main storage memory of the CPU 111, and used as a work area or a temporary storage area for developing various programs stored in the storage 114. The storage 114 stores image data, various programs, and various kinds of setting information. According to the present exemplary embodiment, it is assumed that a flash disk, such as a solid-state disk (SSD), is used as the storage 114. Alternatively, an auxiliary storage device, such as a hard disk device (HDD), may be adopted.

In the MFP 101, a single CPU (the CPU 111) is assumed to execute each process illustrated in flowcharts to be described below, by using a single memory (the RAM 113), but other configuration may be adopted. For example, two or more CPUs may be configured to operate with two or more RAMs, ROMs, and storages, to execute each process illustrated in the flowcharts to be described below. In addition, a part of processing may be executed by using a hardware circuit.

An operation-unit I/F 115 connects an operation unit 116 to the control unit 110. The operation unit 116 includes a liquid crystal display unit having a touch panel function, a keyboard, and the like, and functions as a receiving unit that receives an instruction from a user.

A printer I/F 117 connects a printer 118 to the control unit 110. Image data to be printed by the printer 118 is transferred from the control unit 110 to the printer 118 via the printer I/F 117, and then printed on a sheet, such as paper, by the printer 118.

A scanner I/F 119 connects a scanner 120 to the control unit 110. The scanner 120 generates image data (an image file) by reading a document set in the MFP 101, and transfers the generated image data to the storage 114 of the control unit 110 via the scanner I/F 119.

FIG. 2A is a cross-sectional diagram illustrating the scanner 120 of the MFP 101. The scanner 120 can read a sheet of document set on a document positioning plate 200 (specifically, between a document-positioning-plate cover 219 and the document positioning plate 200).

Figure 2B:
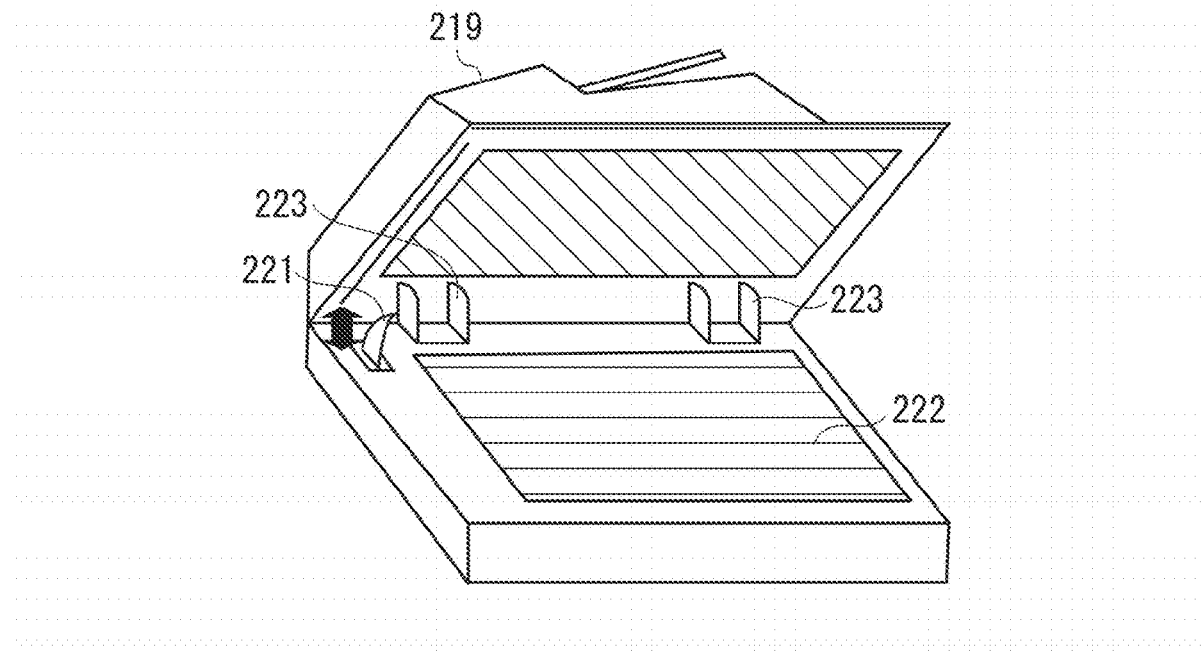

FIG. 2B is a perspective diagram illustrating the scanner 120 of the MFP 101. As illustrated in FIG. 2B, the user can lift the document-positioning-plate cover 219 (open the document-positioning-plate cover 219) which thereby swings open about hinges 223 disposed at the document positioning plate 200. When the document-positioning-plate cover 219 is lifted so that the document positioning plate 200 is uncovered, the user can set a document on a platen glass 222 of the document positioning plate 200. The document-positioning-plate cover 219 also functions as a pressing plate for holding down the document set on the platen glass 222.

An open/close sensor 221 detects whether the document-positioning-plate cover 219 is in an open state or in a closed state. The open/close sensor 221 is, for example, a switch protruding from a top surface of the document positioning plate 200. The open/close sensor 221 detects a state illustrated in FIG. 2A where the document-positioning-plate cover 219 is closed and the switch is pressed by the document-positioning-plate cover 219, as the closed state of the document-positioning-plate cover 219. On the other hand, the document-positioning-plate cover 219 detects a state illustrated in FIG. 2B where the document-positioning-plate cover 219 is lifted to open so that a pressure applied onto the switch is removed, as the open state of the document-positioning-plate cover 219.

The scanner 120 turns on a lamp 211, and scans the document set on the document positioning plate 200 while moving an optical unit 212. At this moment, light reflected from the document is guided to a charge-coupled device (CCD) image sensor (hereinafter referred to as "CCD") 217 via mirrors 213, 214, and 215 as well as a lens 216. The CCD 217 generates image data by reading the light reflected from the document. Upon completion of reading of the document set on the document positioning plate 200, the optical unit 212 is moved to a document-reading starting position for reading the next document.

The scanner 120 can also read a batch of documents set in a document feeding unit (hereinafter referred to as "automatic document feeder (ADF)") 201. In such a case, the ADF 201 feeds and conveys sheet by sheet the set batch of documents to the optical unit 212. The conveyed documents are each read by the optical unit 212 and then discharged to a discharge tray 218. Further, the scanner 120 can detect whether documents are set in the ADF 201, by using a document-feeder (DF) document detection sensor not illustrated. The control unit 110 (the CPU 111) is notified of output of the open/close sensor 221 and the DF document detection sensor, via the scanner I/F 119.

According to the present exemplary embodiment, use of an MFP including an ADF is assumed, but the present invention is also applicable to an MFP including no ADF and configured to read a document set in a document positioning plate.

The description will continue with reference again to FIG. 1. The MFP 101 can transfer the image data generated by the scanner 120 to the printer 118 to print the image data (a copy job). Further, the MFP 101 can also send the image data generated by the scanner 120, by using various sending protocols (a send job). Furthermore, the MFP 101 can also save the image data generated by the scanner 120 in a storage area from/to which the MFP 101 can read/write data (a save job).

A modem I/F 121 connects a modem 122 to the control unit 110. The modem 122 is connected to a public switched telephone network (PSTN) 102, and can execute facsimile transmission/reception of image data to/from a facsimile device not illustrated.

A network I/F 123 connects the control unit 110 (the MFP 101) to a local area network (LAN) 103. The network I/F 123 transmits image data and information to an external device (such as a mail server, a file server, and a personal computer (PC)) on the LAN 103, and receives information from the external device on the LAN 103.

Figure 3:
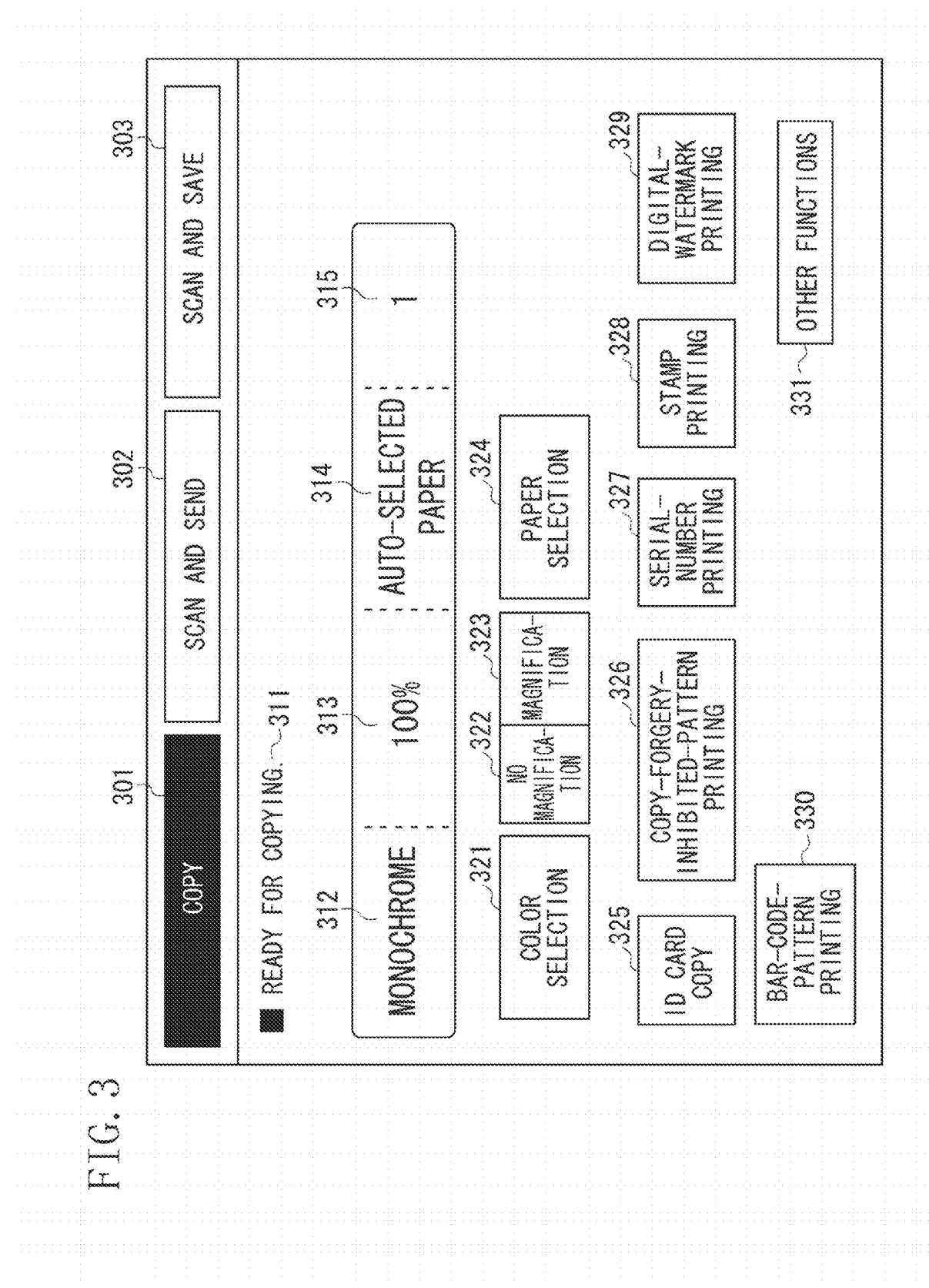
FIG. 3 is a diagram illustrating an operation screen of the MFP according to the exemplary embodiment of the present invention.
Figure 4A:
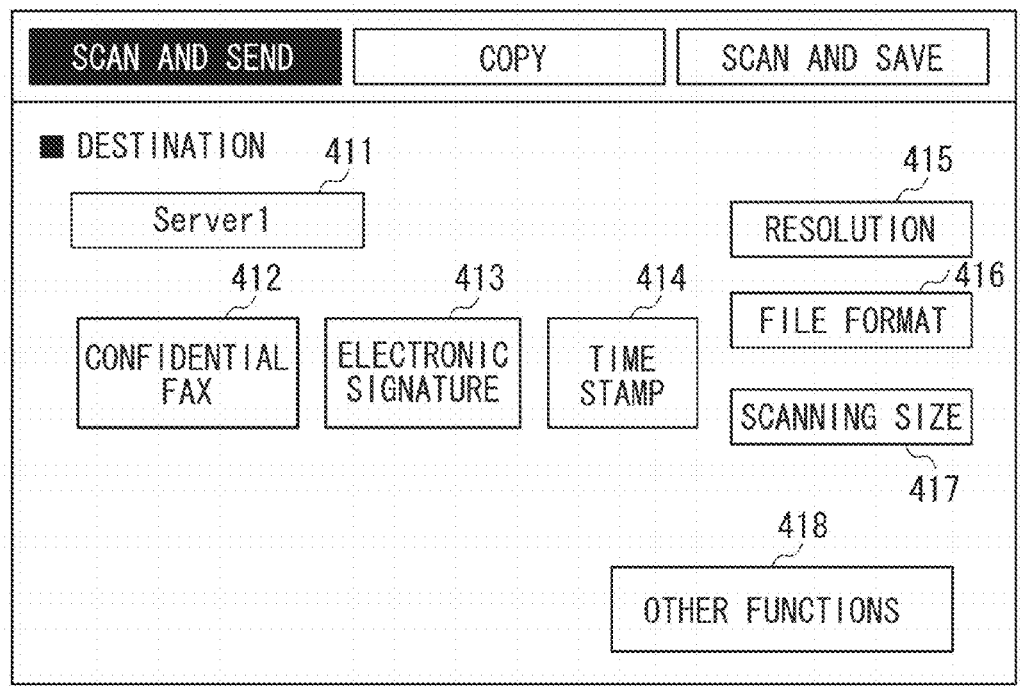
FIGS. 4A and 4B are diagrams each illustrating an operation screen of the MFP according to the exemplary embodiment of the present invention.
Figure 4B:
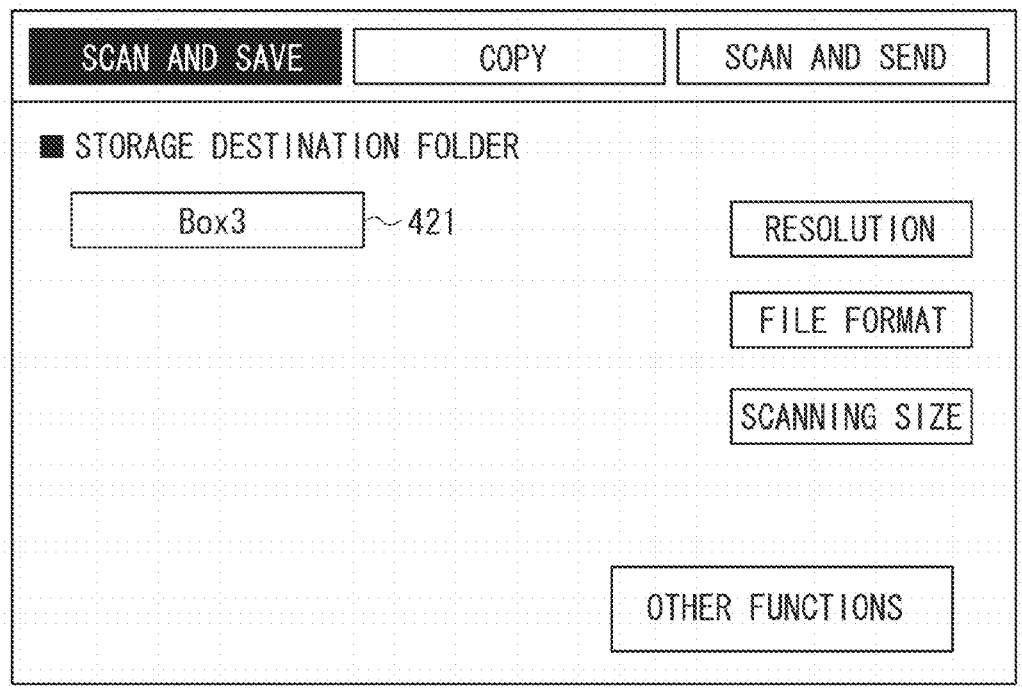

When the user starts using the MFP 101, a window for setting processing to be executed is displayed. FIGS. 3, 4A, and 4B are diagrams each illustrating an example of an output setting window displayed on the operation unit 116. The user can designate processing to be executed, by operating operation keys 301 to 303 on the window illustrated in FIG. 3. FIG. 3 is an example of a state where the operation key 301 is selected. In FIG. 3, "COPY", "SCAN AND SEND", and "SCAN AND SAVE" are each illustrated as an example of a function. However, the MFP 101 may include other functions.

When selecting the operation key 301, the user can set details of the copy job via the touch panel of the operation unit 116. Information 311 notifies the user that the user can start executing the copy job by pressing a start key provided as a hard key outside the screen. Information 315 notifies the user of the number of copies. The user can enter the number of copies via a numeric keypad provided as hardware keys outside the screen.

An operation key 321 is used for selecting an output color of a print product. An operation key 322 is used for setting a magnification of a print product to be equal to a document size. On the other hand, an operation key 323 is used for arbitrarily changing the magnification of the print product relative to the document size. An operation key 324 is used for selecting a sheet to be used in printing. Information 312 to information 314 are provided to notify the user of a copy-related setting status set by the operation keys 321 to 324.

An operation key 325 is used for setting an identification (ID)-card copy function in the copy job. The ID-card copy function is provided to read the front side and the back side of a card-shaped document, such as an identification card (e.g., a driver's license and a health insurance card), and to print image data of these sides on a sheet. The details will be described below in description of a print operation for image data.

An operation key 326 is used for setting a copy-forgery-inhibited-pattern printing function in the copy job. The copy-forgery-inhibited-pattern printing function is provided to embed copy-forgery-inhibited-pattern data in the image data generated by the scanner 120 as a background, and then to print this image data. The copy-forgery-inhibited-pattern data refers to image data that appears as a mere design or background having a low density in an original (an output print product), but emerges as a predetermined character sequence or a mark, such as "COPY", on an copy output product of the original. When a print product on which a copy-forgery-inhibited-pattern is embedded is copied, the copy-forgery-inhibited-pattern emerges on a copy, whereby it makes apparent that the copy is information secondarily copied. The copy-forgery-inhibited-pattern printing function is devised to prevent easy reproduction of an original by copying. Therefore, there is an effect of preventing an original from being copied.

An operation key 327 is used for setting a serial-number printing function. The serial-number printing function is provided to superimpose a character sequence, such as a model name, a management number, and a serial number of the MFP 101, as identification information, on the image data generated by the scanner 120, and then to print the image data. This function is utilized for tracking which of MFPs have printed a print product. There may be a case where a user logs in to an MFP by entering a department ID or a user ID, to use the MFP. In this case, a character sequence representing the department ID or the user ID may be superimposed as the identification information.

An operation key 328 is used for setting a stamp printing function. The stamp printing function is provided to superimpose a character sequence or a pattern indicating, for example CLASSIFIED, CONFIDENTIAL, or the like, on the image data generated by the scanner 120, and then to print the image data. This function is used for recommending careful handling of a print product.

An operation key 329 is used for setting a digital-watermark printing function. The digital-watermark printing function is provided to embed a code image in the image data generated by the scanner 120, as a background. The code image is formed of predetermined dots that are inconspicuous at a glance. In other words, this function is used for embedding digital information related to a print product, by utilizing displacement of the dots.

An operation key 330 is used for setting a bar-code-pattern printing function. The bar-code-pattern printing function is provided to superimpose a code symbol to which digital information is added, on the image data generated by the scanner 120, and then to print the image data. Examples of the code symbol include a two-dimensional code represented by a Quick Response Code (QR Code) (registered trademark), and a bar code.

The digital-watermark printing function and the bar-code-pattern printing function are used for, for example, merchandise management, or marking intended to prevent leakage of personal information or confidential information. For example, in the digital-watermark printing function and the bar-code-pattern printing function, additional information for restricting copying can be embedded in a print product as digital information. Further, additional information, such as identification information of a user or an MFP and an output date of a print product may be embedded to track the print product.

In a case where the MFP reads the print product subjected to the digital-watermark printing or the bar-code-pattern printing, information leakage can be prevented by the MFP prohibiting making a copy or prompting a user to input a password for making a copy, depending on the additional information.

The description will continue with reference again to FIG. 3. An operation key 331 is provided for a transition to a screen for advanced settings other than the currently displayed settings.

The user can start the copy job, by pressing the start key provided as a hard key outside the screen.

When the user selects the operation key 302, a transition to a window for setting the send job (SCAN AND SEND) occurs. Upon selecting the operation key 302, the user can perform setting for the send job, via the touch panel of the operation unit 116. FIG. 4A is an example of an output setting window in a state where the operation key 302 is selected.

The user can set a destination of image data to be sent, by operating an operation key 411. Upon operating the operation key 411, the user can set the destination of the image data to be sent, by referring to an address book (not illustrated) held in the RAM 113 or the storage 114. The user can also enter a new destination via the operation unit 116, thereby setting the new destination as the destination of the image data to be sent.

An operation key 412 is used for setting a confidential-facsimile function. The confidential-facsimile function is provided to perform facsimile transmission requiring confidential handling, by using an F code, when sending image data to a facsimile device. When no facsimile device is included in the destinations for sending image data, the operation key 412 may be grayed out or may not be displayed. The confidential-facsimile function will be described in detail, in description of image-data sending operation.

An operation key 413 is used for setting an electronic-signature function in image data (a file) to be sent. In a case where an electronic signature is added, it is possible to certify the file by embedding signature information corresponding to a predetermined device (the MFP 101) in the file, so that a receiver can recognize which device has scanned the file. Further, there may be a case where a user may log in to a MFP by entering a user ID, to use the MFP. In such a case, certification of which of user have scanned the file can be performed for the receiver.

An operation key 414 is used for setting a time-stamp function. The time-stamp function is provided to perform certification of the presence of the file at the stamped time, for the receiver, by embedding predetermined time information (a time stamp token) guaranteed by a third party in a file. The receiver can confirm the presence of data in the file at the stamped time and no occurrence of manipulation, by comparing the time stamp issued by the third party, with the time information embedded in the file.

An operation key 415 is used for setting a reading resolution. An operation key 416 is used for setting a file format of image data to be sent. An operation key 417 is used for selecting the size of a document to be scanned by the scanner 120. An operation key 418 is used for a transition to a window for setting details for the send job, other than the currently displayed settings.

Further, the user can execute the send job for reading a document and then sending image data of the read document, by pressing the start key provided as a hard key outside the screen.

The description will continue with reference again to FIG. 3. When the user selects the operation key 303, a transition to a window for setting the save job (SCAN AND SAVE) occurs. Upon selecting the operation key 303, the user can set the save job via the touch panel of the operation unit 116. FIG. 4B is an example of an output setting window in a state where the operation key 303 is selected.

The user can set a storage area for saving image data by operating an operation key 421. Upon operating the operation key 421, the user can select a storage destination of the image data by referring to a storage destination list held in the RAM 113 or the storage 114. The storage destination of the image data may be a storage area provided in the storage 114 of the MFP 101, or may be a storage area of a device, such as an external server, from/to which the MFP 101 can read/write data via the LAN 103.

Further, the user can execute the save job for reading a document and saving image data of the read document, by pressing the start key provided as a hard key outside the screen.

FIG. 5 is a flowchart illustrating copying, sending or saving operation in the MFP 101. Each operation illustrated in the flowchart of FIG. 5 is implemented in a manner such that the CPU 111 of the MFP 101 executes the control program stored in the ROM 112 or the storage 114.

When the user starts using the MFP 101, then in step S501, the CPU 111 receives setting of processing to be executed. The user selects the processing to be executed and performs the setting of the processing via the above-described windows illustrated in FIGS. 3, 4A, and 4B that are displayed on the operation unit 116. In step S502, the CPU 111 receives an execution instruction to execute the copy job, the send job, or the save job. The execution instruction is issued at the press of the start key provided as a hard key outside the screen. Upon receipt of the execution instruction, the operation proceeds to step S503, and the CPU 111 starts executing the job.

Figure 7A:
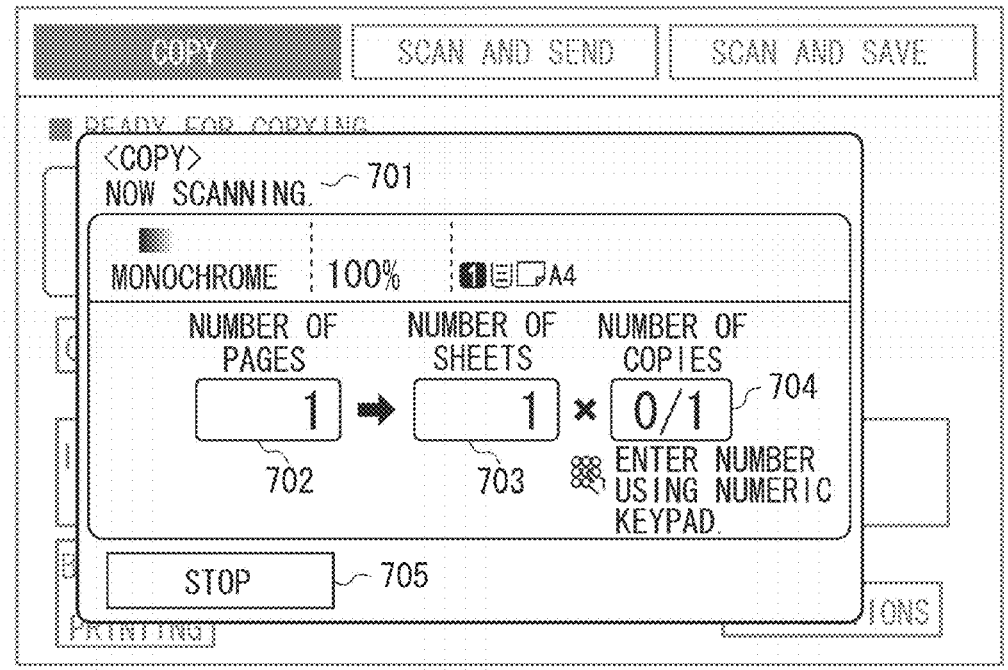
FIGS. 7A, 7B, and 7C are diagrams each illustrating an operation screen of the MFP according to the exemplary embodiment of the present invention.
Figure 7B:
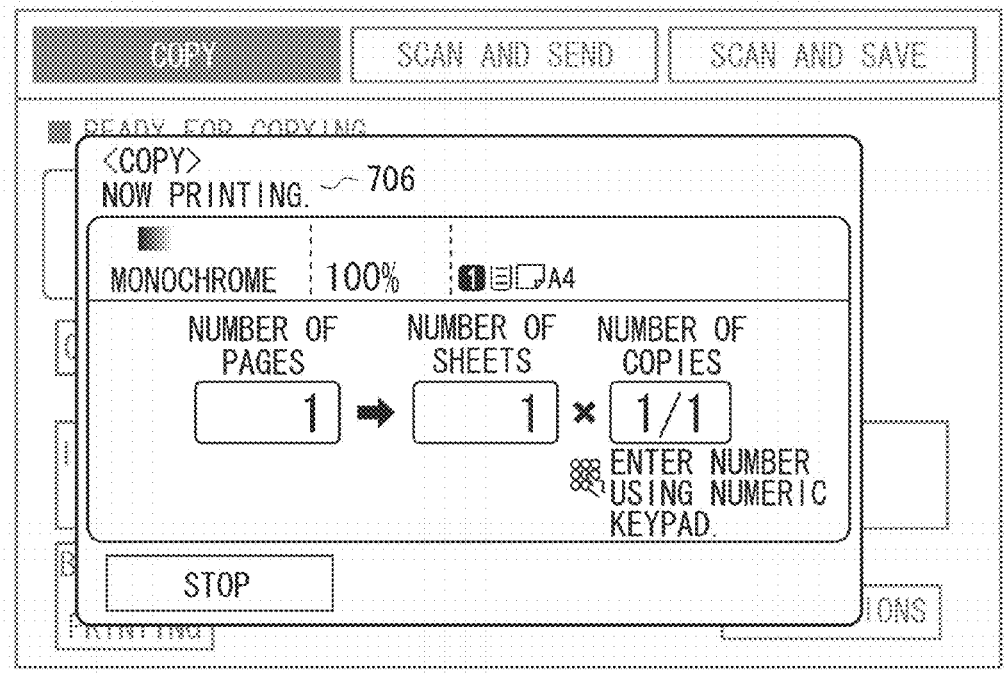
Figure 7C:
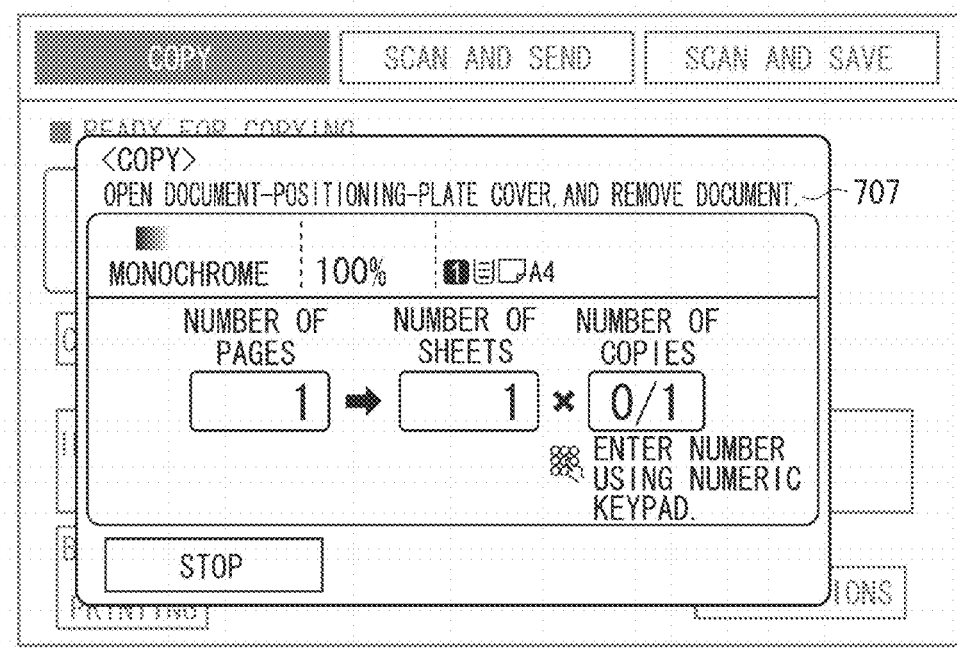

Execution of the copy job will be described. FIGS. 7A to 7C are diagrams each illustrating an example of a copy window displayed on the operation unit 116 during the execution of the copy job.

When the execution of the job begins, in step S503, the CPU 111 determines whether a document is to be read from the document positioning plate 200 or from the ADF 201. In a case where the document is to be read from the ADF 201 (ADF in step S503), the operation proceeds to step S506. In a case where the document is to be read from the document positioning plate 200 (DOCUMENT POSITIONING PLATE in step S503), the operation proceeds to step S504. According to the present exemplary embodiment, in a case where the CPU 111 determines that the document is set in the ADF 201 according to an output of the DF document detection sensor not illustrated, the document is read from the ADF 201. On the other hand, in a case where the CPU 111 determines that no document is set in the ADF 201, the document is read from the document positioning plate 200.

In step S504, the CPU 111 determines whether a predetermined function is set.

According to the present exemplary embodiment, in a case where a function of reading a document, such as an identification card, is set or in a case where a function of adding some kind of security information to an output result is set, the CPU 111 determines that a risk is high if the document is left behind. Therefore, the CPU 111 executes processing for preventing a document from being left behind. In the processing for preventing a document from being left behind, output processing begins in response to determining by the CPU 111 that the document is removed. On the other hand, in a case where none of the security-related functions described above is set, output processing begins upon completion of the reading of the document.

FIG. 6 is a diagram illustrating processing conditions for determining whether the function to be determined that there is a high risk if a document is left behind is set, by way of example. In FIG. 6, in a case where setting for preventing leakage of confidential information or setting for reading an ID card is made for a job, sending of a document is disabled until the document positioning plate 200 is uncovered.

In the copy job, the CPU 111 determines whether at least one of functions corresponding to respective conditions 601 to 606 is set in a currently executed job. In a case where the CPU 111 determines that at least one of the functions corresponding to the respective conditions 601 to 606 is set in the currently executed processing (YES in step S504), the operation proceeds to step S505. In a case where the CPU 111 determines that none of the functions corresponding to the respective conditions 601 to 606 is set in the currently executed processing (NO in step S504), the operation proceeds to step S506.

In step S506, the CPU 111 controls the scanner 120 to read the document to generate image data, and then stores the generated image data in the storage 114. The scanner 120 reads a sheet of document in a case where the CPU 111 determines that the document is to be read from the document positioning plate 200 in step S503. On the other hand, the scanner 120 reads all documents in a batch set in the ADF 201 in a case where the CPU 111 determines that the document is to be read from the ADF 201 in step S503. The image data of the read document(s) is then generated. In step S506, the CPU 111 also causes the operation unit 116 to display a pop-up window for notifying the user of the status of the copy job as illustrated FIG. 7A.

Information 701 notifies the user that reading of the document is in progress. An area 702 notifies the user how many pages of the image data are read by the scanner 120. An area 703 notifies the user how many sheets are to be output per print product. An area 704 notifies the user of how many copies are printed and how many copies are to be printed. An operation key 705 is provided to stop copying.

The description will continue with reference again to FIG. 5. When the image data is generated in step S506, the operation proceeds to step S509, to start output processing. In the copy job, the CPU 111 controls the printer 118 to start processing for printing the image data stored in the storage 114 on a sheet, and causes the operation unit 116 to display the status of the copy job as illustrated in FIG. 7B. Information 706 notifies the user that printing of the read image data is in progress. The output processing ends when printing of the number of copies set by the user is completed. After end of the output processing, the operation state transitions to a state of waiting for setting of new processing, by returning to the output setting window illustrated in FIG. 3.

On the other hand, in step S505, the CPU 111 controls the scanner 120 to generate image data by reading a sheet of document set on the document positioning plate 200, and then stores the generated image data in the storage 114. In addition, the CPU 111 causes the operation unit 116 to display a window for notifying the user of the status of the copy job as illustrated in FIG. 7A. In step S507, the CPU 111 causes the operation unit 116 to display a pop-up window as illustrated in FIG. 7C. Information 707 prompts the user to remove the document by opening the document-positioning-plate cover 219. In step S508, the CPU 111 determines whether the document positioning plate 200 is open, based on a detection result of the open/close sensor 221. In a case where the open state of the document-positioning-plate cover 219 is detected by the open/close sensor 221, the CPU 111 determines that the document positioning plate 200 is open. In a case where the closed state of the document-positioning-plate cover 219 is detected by the open/close sensor 221, the CPU 111 determines that the document positioning plate 200 is not open. In a case where the CPU 111 determines that the document positioning plate 200 is open (YES in step S508), the operation proceeds to step S509 to execute the output processing as illustrated in FIG. 7B. On the other hand, the CPU 111 waits until the document-positioning-plate cover 219 is opened, in a case where the CPU 111 determines that the document positioning plate 200 is not open (NO in step S508). In a case where the operation key 705 for stopping the job is pressed during the execution of each of step S505 to step S509, the CPU 111 stops the processing being executed. The operation state then transitions to a state of waiting for setting of new processing, by returning to the output setting window illustrated in FIG. 3.

A case where the send job is designated will be described. FIGS. 8C and 8D are diagrams each illustrating an example of a sending window displayed on the operation unit 116 during execution of the send job.

The processes in Step S501 to step S503, i.e., output setting, starting job execution, and determination of whether a document is to be read from the document positioning plate 200 or from the ADF 201, are similar to those in the copy job and therefore will not be described.

In the send job, the CPU 111 determines whether at least one of functions corresponding to respective conditions 607 to 610 is set in currently executed processing. In a case where the CPU 111 determines that at least one of the functions corresponding to the respective conditions 607 to 610 is set in the currently executed processing (YES in step S504), the operation proceeds to step S505. In a case where the CPU 111 determines that none of the functions corresponding to the respective conditions 607 to 610 is set in the currently executed processing (NO in step S504), the operation proceeds to step S506.

Here, the confidential-facsimile function (the function corresponding to the condition 607) will be described. In the facsimile transmission using the confidential-facsimile function, a document (image data) is sent to a box set up in a destination facsimile device. When the operation key 412 illustrated in FIG. 4A is pressed in the output setting window, a transition to a window for setting a confidential facsimile occurs.

Figure 8A:
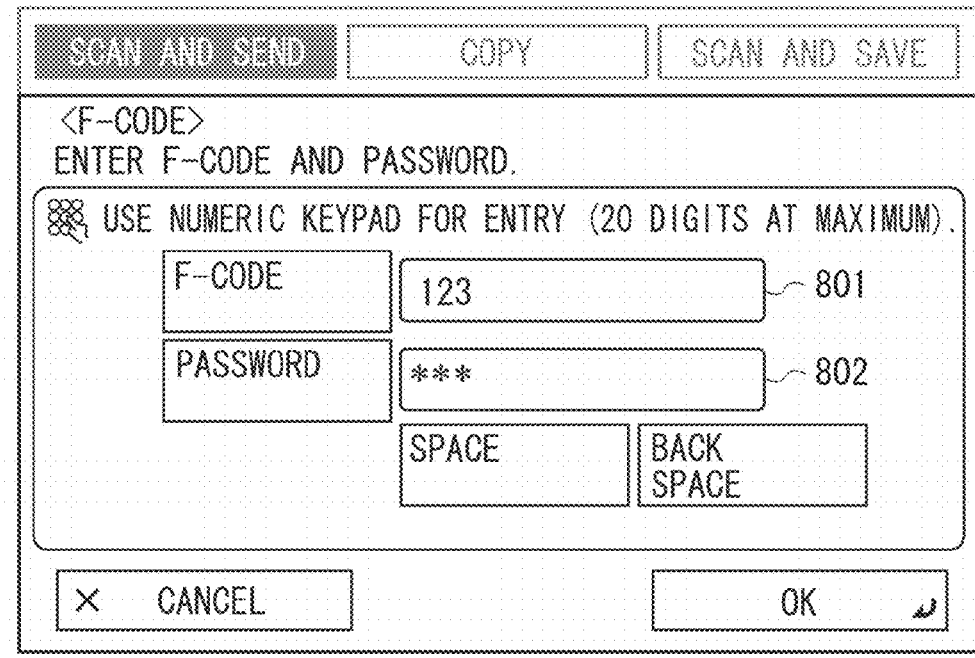
FIGS. 8A, 8B, 8C, and 8D are diagrams each illustrating an operation screen of the MFP according to the exemplary embodiment of the present invention.

FIG. 8A is an example of an output setting window in a state where the operation key 412 is selected. An area 801 is provided to enter a number of the box (an F code). The box set up in the destination facsimile device is provided to store received documents. An area 802 for entering a password corresponding to the box of the destination is provided. A user receiving the confidential facsimile at the other end can print the received document by opening the box. In a case where a password is set in the box, the user enters the password to open the box. In such confidential facsimile transmission, printing is not automatically performed at the time of receiving a facsimile. Therefore, this function is used for sending a document intended to be seen by nobody except a specific person.

A function for setting an encryption password in a file storing image data (the function corresponding to the condition 610) will be described. When the operation key 416 illustrated in FIG. 4A is pressed in the output setting window, a transition to a window for setting a file format occurs. Further, by selecting a Portable Document Format (PDF) file in the window for setting a file format, the user can perform advanced settings of the PDF file.

Figure 8B:
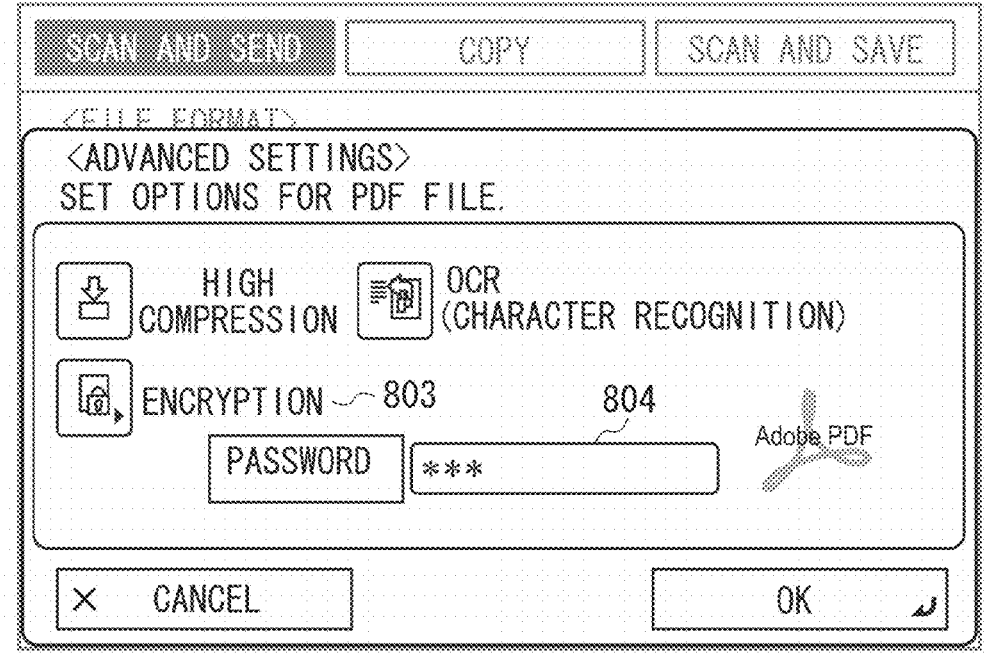
Figure 8C:
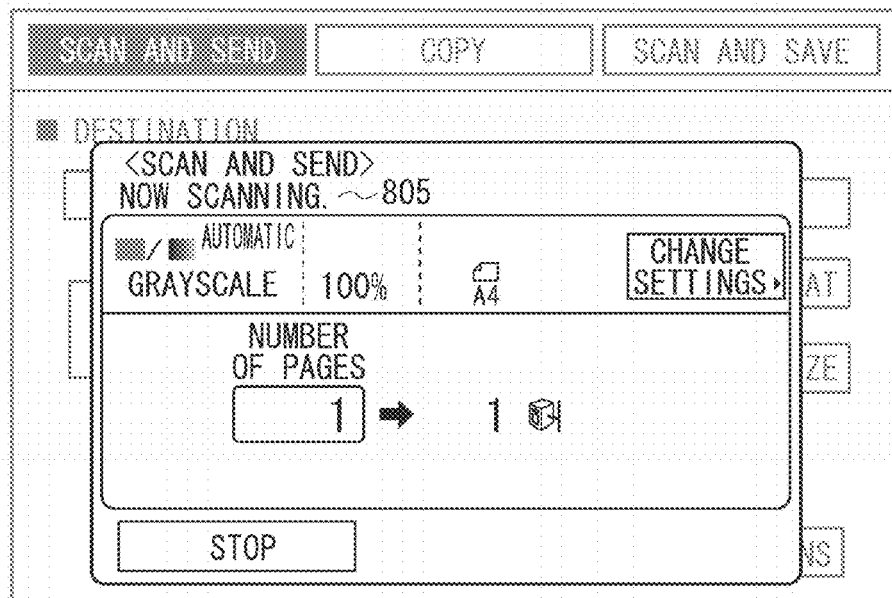
Figure 8D:
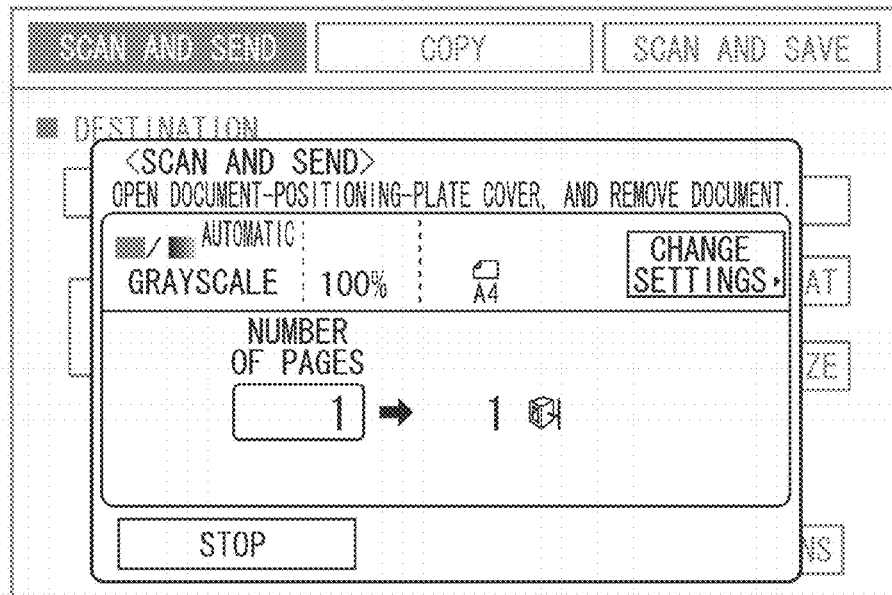

FIG. 8B is an example of a pop-up window for performing the advanced settings of the PDF file. In the pop-up window illustrated in FIG. 8B, the user can perform setting related to a compression ratio of image data, or perform setting of optical character recognition (OCR) for adding text information by analyzing a part considered as text on the image data. In addition, the user can set a password for opening the file. An operation key 803 is used for adding a password to a file to be sent, for opening the file. When the operation key 803 is pressed, an area 804 is displayed in the pop-up window. The user can add an encryption password to the PDF file to be transmitted, by entering a password into the area 804 and then pressing the OK button.

Further, the function corresponding to the condition 608 is the above-described electronic-signature function, and the function corresponding to the condition 609 is the above-described time-stamp function.

The description will continue with reference again to FIG. 5. In a case where the CPU 111 determines that none of the predetermined functions is set in step S504 (NO in step S504), the operation proceeds to step S506. In step S506, the CPU 111 controls the scanner 120 to generate image data by reading the document. In addition, the CPU 111 causes the operation unit 116 to display the status of the send job as illustrated in FIG. 8C. Information 805 notifies the user that reading of the document is in progress. When generation of the image data is completed, the operation proceeds to step S509. Then, the CPU 111 sends the image data stored in the storage 114 to the destination.

On the other hand, in a case where the CPU 111 determines that the predetermined function is set (YES in step S504), the operation proceeds to step S505. In step S505, the CPU 111 controls the scanner 120 to generate image data by reading the document, and notifies the operation unit 116 of the status of the send job as illustrated in FIG. 8C. In step S507 and step S508, the CPU 111 displays a message prompting the user to remove the document as illustrated in FIG. 8D, and waits until the user uncovers the document positioning plate 200 by lifting the document-positioning-plate cover 219. When the document positioning plate 200 is uncovered by the user, the operation proceeds to step S509. Then, the CPU 111 sends the image data stored to the storage 114 to the destination.

Figure 9A:
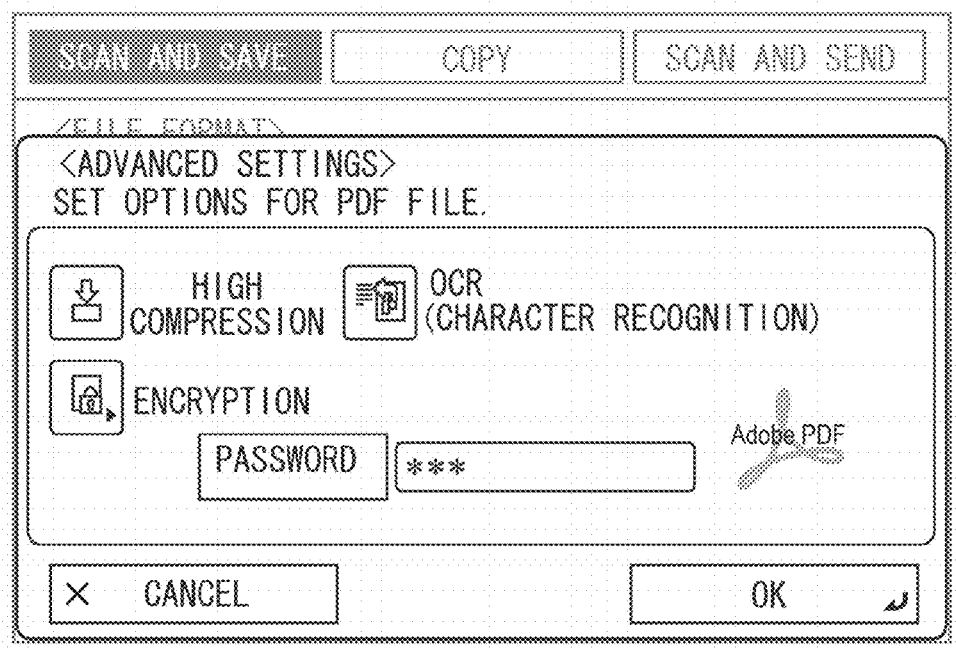
FIGS. 9A, 9B and 9C are diagrams each illustrating an operation screen of the MFP according to the exemplary embodiment of the present invention.
Figure 9B:
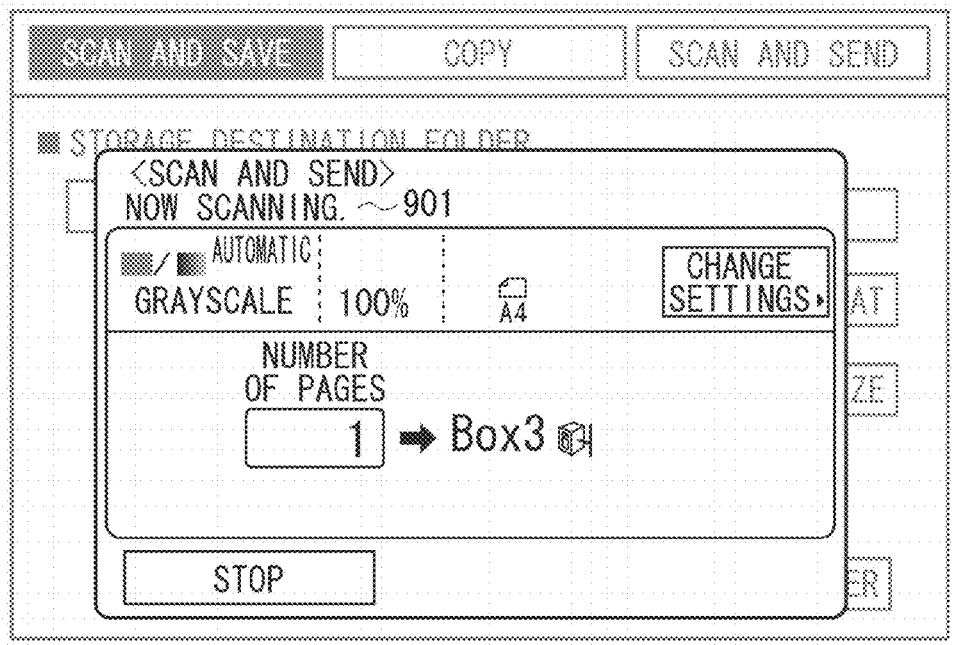
Figure 9C:
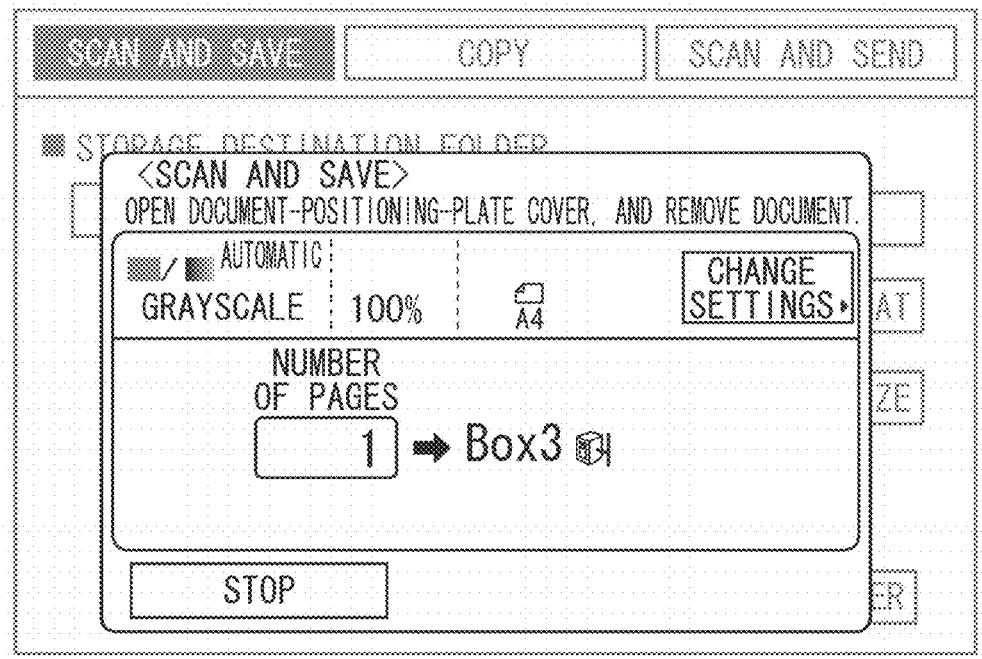

A case where the save job is designated will be described. FIGS. 9B and 9C are diagrams each illustrating an example of a saving window displayed by the operation unit 116 during execution of the save job.

The processes in step S501 to step S503, i.e., output setting, starting job execution, and determination of whether a document is to be read from the document positioning plate 200 or from the ADF 201, are similar to those in the copy job and therefore will not be described.

In the save job, in step S504, the CPU 111 determines whether the function for setting an encryption password in a file storing image data (the function corresponding to the condition 610) is set in a currently executed save job. FIG. 9A is an example of a pop-up window for advanced settings of a PDF file. As with the send job as illustrated in FIG. 8B, the user can add an encryption password to a PDF file to be sent, by entering a password for opening the file and then pressing the OK button.

In a case where the CPU 111 determines that the function corresponding to the condition 610 illustrated in FIG. 6 is not set (NO in step S504), the operation proceeds to step S506. In step S506, the CPU 111 reads image data, and causes the operation unit 116 to display the status of the save job as illustrated in FIG. 9B. Information 901 notifies the user that reading of the document is in progress. When generation of the image data is completed, the operation proceeds to step S509 The, the CPU 111 saves the generated image data in a box of a storage destination.

On the other hand, in a case where the CPU 111 determines that the function corresponding to the condition 610 is set (YES in step S504), the operation proceeds to step S505. In step S505, the CPU 111 controls the scanner 120 to generate image data by reading a document, and notifies the user of the status of the save job as illustrated in FIG. 9B. In step S507 and step S508, the CPU 111 displays a message prompting the user to remove the document as illustrated in FIG. 9C, and waits until the user uncovers the document positioning plate 200 by lifting the document-positioning-plate cover 219. When the document positioning plate 200 is uncovered by the user, the operation proceeds to step S509. Then, the CPU 111 saves the generated image data in the box of the storage destination.

The description has been provided by using the case where the output processing is performed by reading a sheet of document from the document positioning plate 200. However, in a case where the ID-card copy function is set, it is necessary to read the front side and the back side of a document. Therefore, reading control different from the reading control for other settings is performed in such a case. Therefore, the reading control for reading the front side and the back side of a document will be described, by using a case where the ID-card copy function is set in the output setting window illustrated in FIG. 3 of the copy job.

<Reading Control in a Case where ID-Card Copy Function is Set>

Figure 11A:
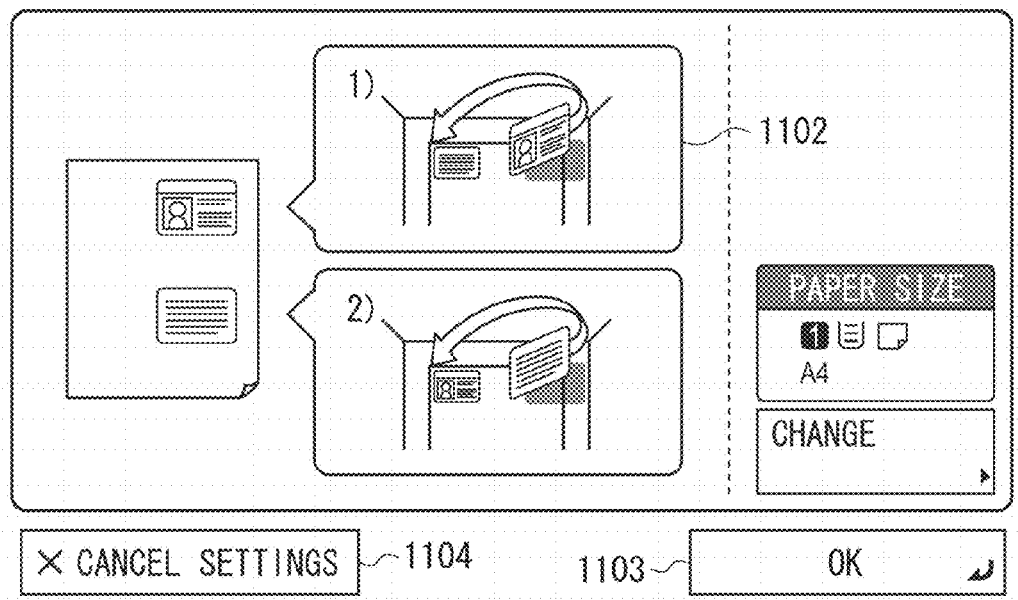
FIGS. 11A, 11B, and 11C are diagrams each illustrating an operation screen of the MFP according to the exemplary embodiment of the present invention.

When the operation key 325 illustrated in FIG. 3 is pressed in the output setting window, a transition to a window for setting the ID-card copy function occurs. FIG. 11A illustrates a window for setting the ID-card copy function. Information 1101 and information 1102 notify the user that the selected function is to read the front side of an ID card and then the back side of the ID card, and further to copy the both sides on a sheet.

Pressing an operation key 1103 sets the ID-card copy function in the copy job. On the other hand, pressing an operation key 1104 cancels setting of the ID-card copy function.

Figure 10:
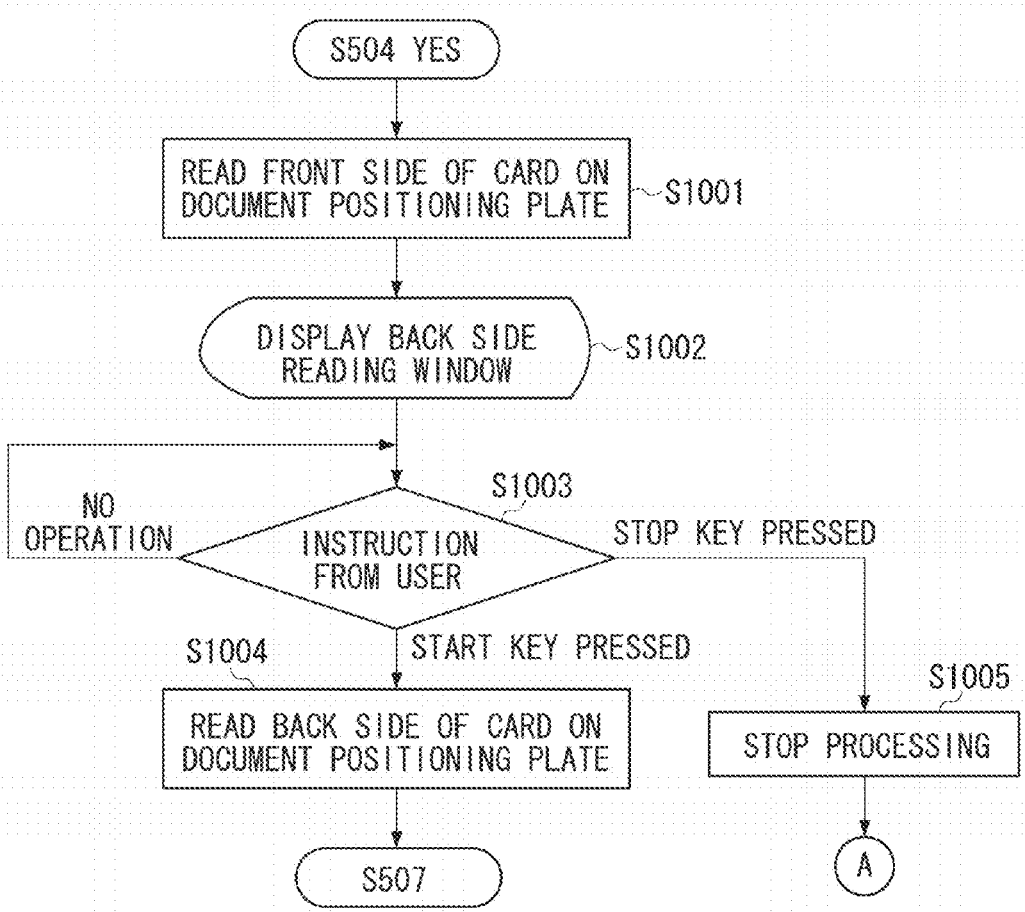
FIG. 10 is a flowchart illustrating a document reading operation of the MFP according to the exemplary embodiment of the present invention.

In a case where the ID-card copy function is set by the user, an operation for reading the front side and then the back side of the document illustrated in FIG. 10 is performed in step S505, instead of the operation for reading a sheet of document. In a case where the ID-card copy function is set, the CPU 111 controls the scanner 120 to read a document set on the document positioning plate 200, even if there are documents set in the ADF 201.

FIG. 10 is a flowchart illustrating a document reading operation in the MFP 101 when the ID-card copy function is set. Each operation illustrated in the flowchart of FIG. 10 is implemented in a manner such that the CPU 111 of the MFP 101 executes the control program stored in the ROM 112 or the storage 114.

Figure 11B:
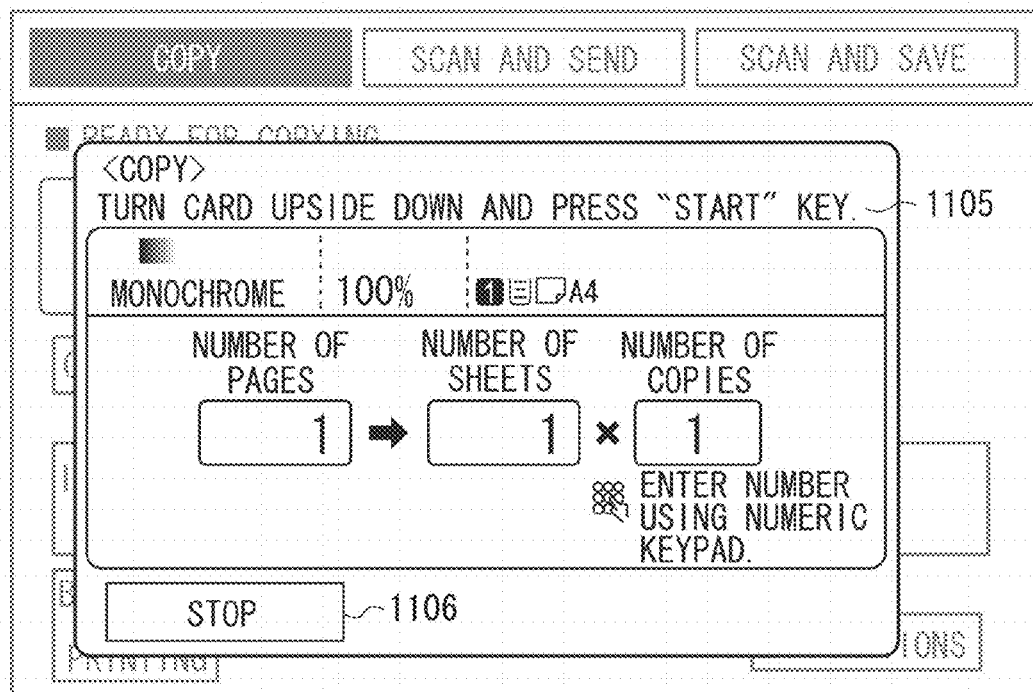

In step S1001, the CPU 111 controls the scanner 120 to generate image data by reading a document from the document positioning plate 200. When reading of the document is completed, the CPU 111 displays a back-side reading window provided to wait for reading of the back side. FIG. 11B illustrates an example of the back-side reading window displayed to the user in step S1002. Information 1105 prompts the user to turn the ID card upside down and then to press the start key (not illustrated) provided to start reading, so that reading of the back side of the ID card is performed.

The description will continue with reference again to FIG. 10. Upon display of the back-side reading window in step S1002, the operation proceeds to step S1003. In step S1003, the CPU 111 changes the processing in response to an instruction provided from the user via the operation unit 116. in a case where the start key is pressed (START KEY PRESSED in step S1003), the operation proceeds to step S1004. In step S1004, the CPU 111 starts reading the document on the back side of the ID card. In a case where an operation key 1106 is pressed (STOP KEY PRESSED in step S1003), the operation proceeds to step S1005. In step S1005, the CPU 111 stops processing for reading the image data. In response to the processing for reading the image data being stopped, the output setting window illustrated in FIG. 3 is displayed and the operation state transitions to a state of waiting for setting of new processing. On the other hand, in a case where the user performs no operation, the CPU 111 keeps waiting for operation from the user.

Figure 11C:
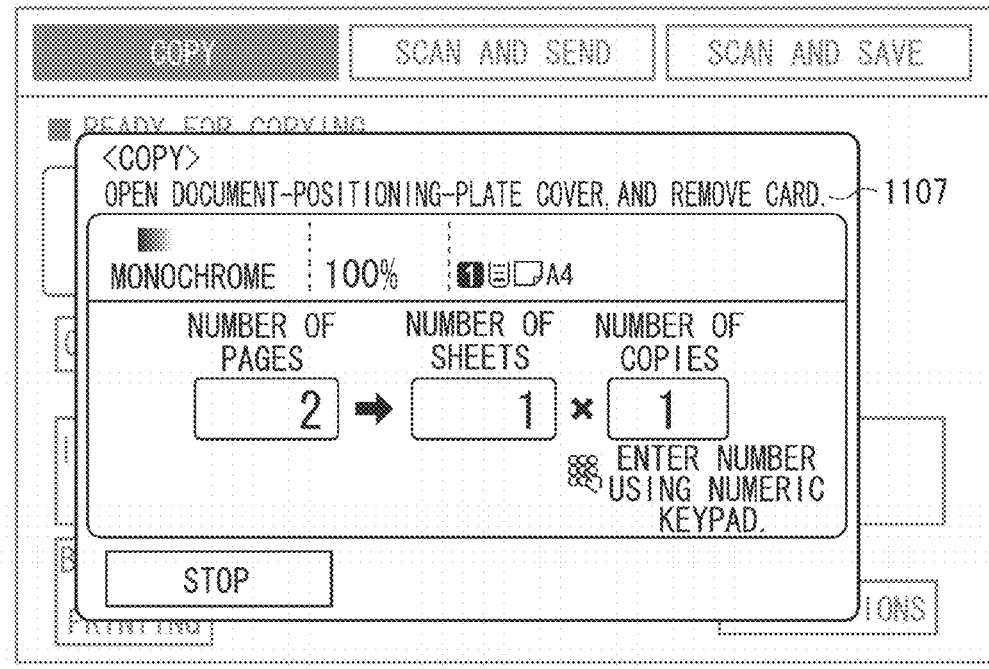

In step S1004, the CPU 111 controls the scanner 120 to generate image data by reading a sheet of document from the document positioning plate 200. The control unit 110 converts the image data obtained by the reading in step S1002 and the image data obtained by the reading in step S1004 into one piece of image data. Upon generation of the one piece of image data by reading the front side and the back side of the ID card in step S1001 to step S1004, the operation proceeds to processing of awaiting for uncovering of the document positioning plate 200 in step S507 to step S509 of the flowchart illustrated in FIG. 5. FIG. 11C illustrates an example of a display window displayed to the user in step S507. Information 1107 prompts the user to remove the ID card by opening the document-positioning-plate cover 219.

In the way described above, in a case where the ID-card copy function is set, the reading control is performed in a manner such that when the document positioning plate 200 is uncovered after reading of the front side, the output processing is suspended, and then reading of the back side is performed.

As described above, in a case where copying, sending, or saving processing is performed by reading a document from the document positioning plate 200, the copying, sending, or saving processing is not executed until the document positioning plate 200 is uncovered, if a predetermined security-related function is set. The processing designated by the user is not performed until the document-positioning-plate cover 219 is opened. Therefore, it is possible to prevent a document from being left behind. On the other hand, in a case where a document is read from the ADF 201, or in a case where no predetermined function is set in a job (NO in step S504), the output processing is performed without waiting for uncovering of the document positioning plate 200. Therefore, output processing that does not require processing effort of the user can be performed.

Next, a second exemplary embodiment of the present invention will be described. According to the first exemplary embodiment, in a case where the output processing is performed by reading a sheet of document from the document positioning plate, the output processing is not executed until the document-positioning-plate cover is opened, if a predetermined function is set.

According to the second exemplary embodiment, reading control that allows reading of a plurality of sheets of document from a document positioning plate will be described. Specifically, the processing of step S505 according to the first exemplary embodiment is replaced with the reading control that allows reading of a plurality of sheets of documents from the document positioning plate.

Figure 12:
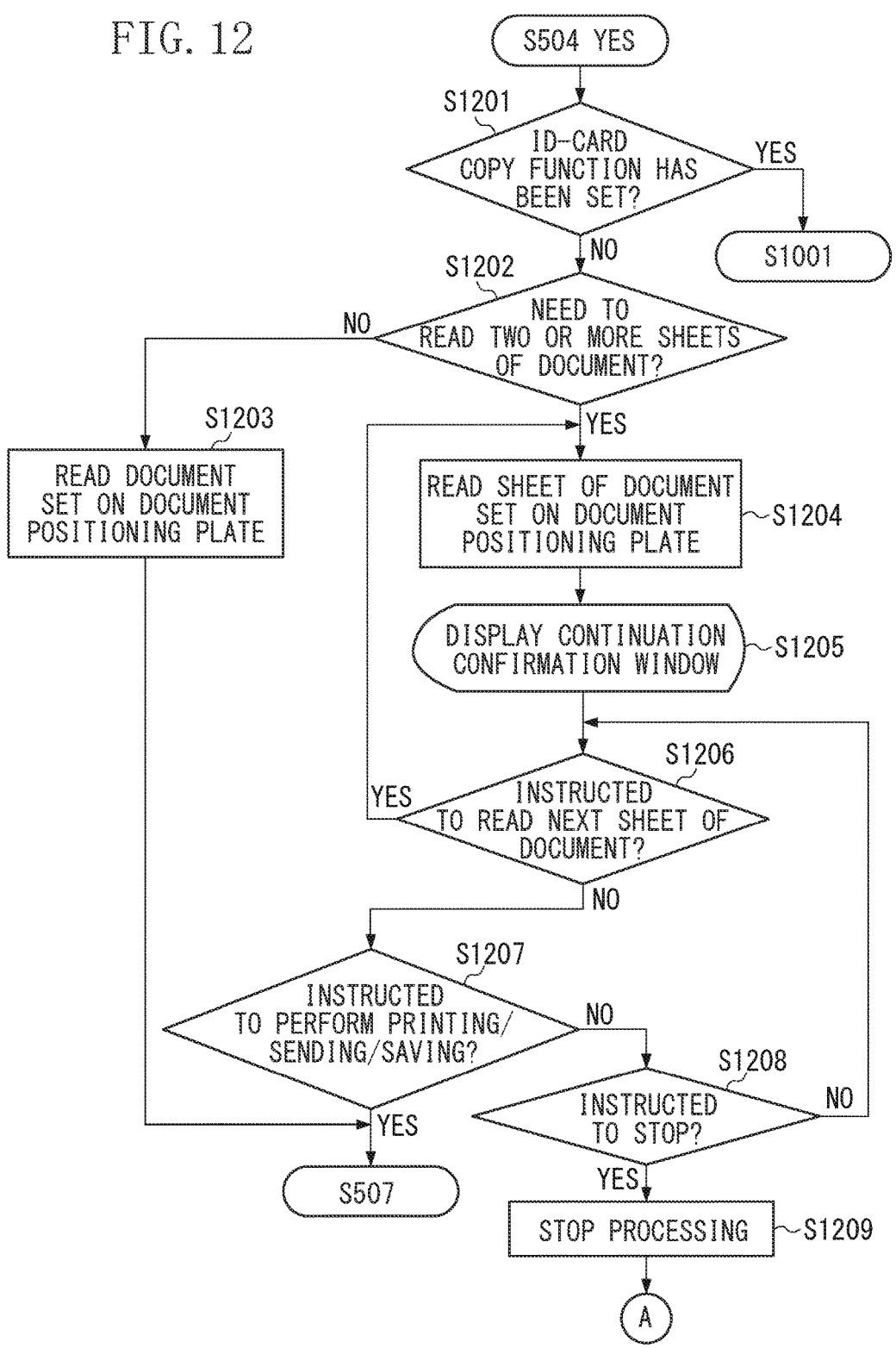
FIG. 12 is a flowchart illustrating a document reading operation of a MFP in an exemplary embodiment of the present invention.
Figure 13:
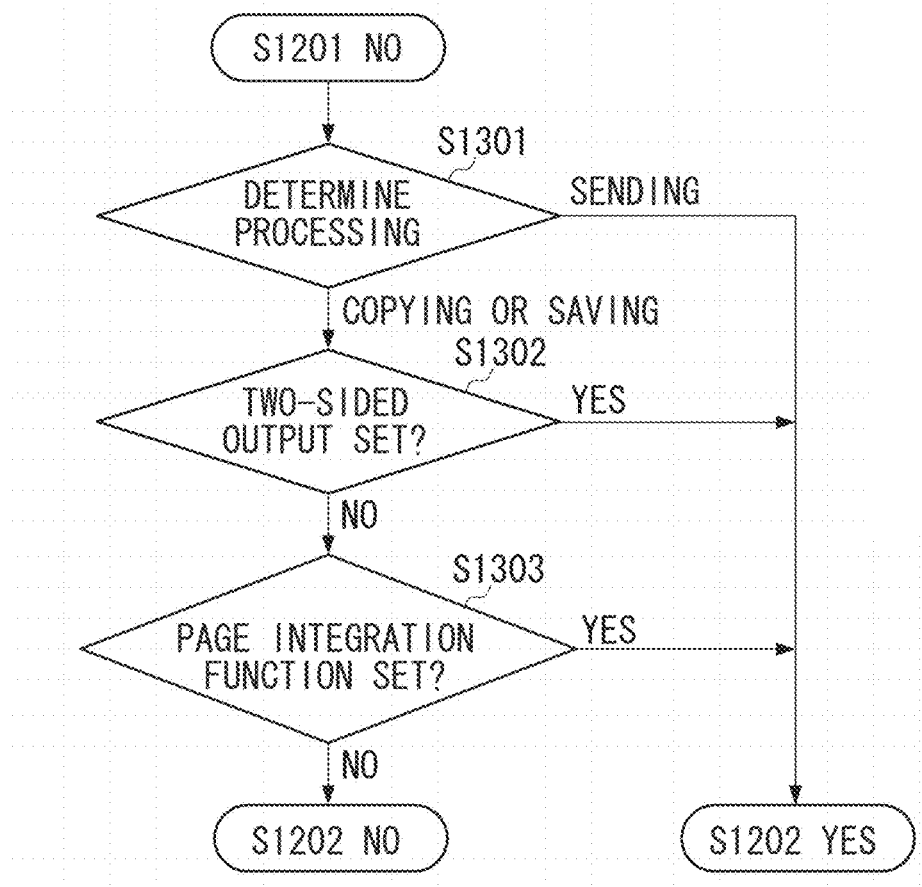
FIG. 13 is a flowchart illustrating a document reading operation of the MFP in the exemplary embodiment of the present invention.

FIGS. 12 and 13 are flowcharts illustrating an operation for reading a plurality of sheets of documents in an MFP 101. Each operation illustrated in the flowcharts in FIGS. 12 and 13 is implemented in a manner such that a CPU 111 of the MFP 101 executes a control program stored in a ROM 112 or a storage 114.

In a case where the CPU 111 determines that a predetermined function is set in a currently executed job in step S504 of FIG. 5 (YES in step S504), the operation proceeds to step S1201. In step S1201, the CPU 111 determines whether an ID-card copy function is set in the currently executed job. In a case where the ID-card copy function is set in the currently executed job (YES in step S1201), the operation proceeds to step S1001 to generate one piece of image data by reading the front side and the back side of an ID card. The operation then proceeds to step S507. In step S507 to step S509, copy processing for the image data is performed in response to a document positioning plate 200 being uncovered.

On the other hand, in a case where the CPU 111 determines that the ID-card copy function is not set in the currently executes job (NO in step S1201), the operation proceeds to step S1202. In step S1202, the CPU 111 determines whether it is necessary to read a plurality of sheets of document. The CPU 111 determines whether it is necessary to read a plurality of sheets of document, specifically according to each operation in the flowchart of FIG. 13.

In a case where the ID-card copy function is not set (NO in step S1201), the operation proceeds to step S1301. In step S1301, the CPU 111 determines a job type. In a case where the job type is a send job, the CPU 111 determines that it is necessary to read a plurality of sheets of document.

On the other hand, in a case where the job type is a copy job or a save job, the operation proceeds to step S1302. In step S1302, the CPU 111 determines whether a two-sided output function has been set in advanced settings of the job. The two-sided output function can be set in the copy job. The two-sided output function is provided to read image data of a plurality of pages and to print the image data on the front side and the back side of a sheet. In a case where the two-sided output function is set (YES in step S1302), the CPU 111 determines that it is necessary to read a plurality of sheets of document. On the other hand, in a case where the two-sided output function is not set (NO in step S1302), the operation proceeds to step S1303.

In step S1303, the CPU 111 determines whether a page integration function is set. The page integration function is provided to read image data of a plurality of pages and then to print the image data of the plurality of pages on a sheet, or to send or save the image data as image data in which the plurality of pages are integrated in one page. For example, this function allows 2-in-1 page integration in which pieces of image data for two pages are integrated into one page. Further, it is possible to output one page including integrated multiple pages, such as 4-in-1, 6-in-1, and 8-in-1 page integration. In a case where any of these page integration functions is set (YES in step S1303), the CPU 111 determines that it is necessary to read a plurality of sheets of document. On the other hand, in a case where none of the page integration functions is set (NO in step S1303), the CPU 111 determines that it is not necessary to read a plurality of sheets of document.

According to the present exemplary embodiment, the two-sided output function and the page integration function can be set via the output setting window or "OTHER FUNCTIONS" in the output setting window illustrated FIGS. 3, 4A, and 4B.

Further, according to the present exemplary embodiment, the flowchart of FIG. 12 exemplifies the determination of whether it is necessary to read a plurality of sheets of document, but this is not limitative. For example, whether to read a plurality of sheets of document may be set in the output setting window illustrated in FIG. 3, and whether to read a plurality of sheets of document may be determined in step S1304. Furthermore, the sequence of determination in step S1301 to step S1303 may be changed. Moreover, although the CPU 111 determines that it is necessary to read a plurality of sheets of document in case of the send job for sending the image data in step S1301, the CPU 111 may be configured not to perform the determination of step S1301.

The description will continue with reference again to FIG. 12. In a case where the CPU 111 determines that it is not necessary to read a plurality of sheets of document in step S1202 (NO in step S1202), the operation proceeds to step S1203. In step S1203, the CPU 111 controls the scanner 120 to read a sheet of document set on the document positioning plate 200, and then the operation proceeds to the processing of waiting for uncovering of the document positioning plate 200 in step S507 to step S509 of FIG. 5.

On the other hand, in a case where the CPU 111 determines that it is necessary to read a plurality of sheets of document in step S1202 (YES in step S1202), the operation proceeds to step S1204. In step S1204, the CPU 111 controls the scanner 120 to generate image data by reading a sheet of document set on the document positioning plate 200, and the operation proceeds to step S1205. In step S1205, the CPU 111 displays a continuation confirmation window for inquiring whether to read the next document.

Figure 14A:
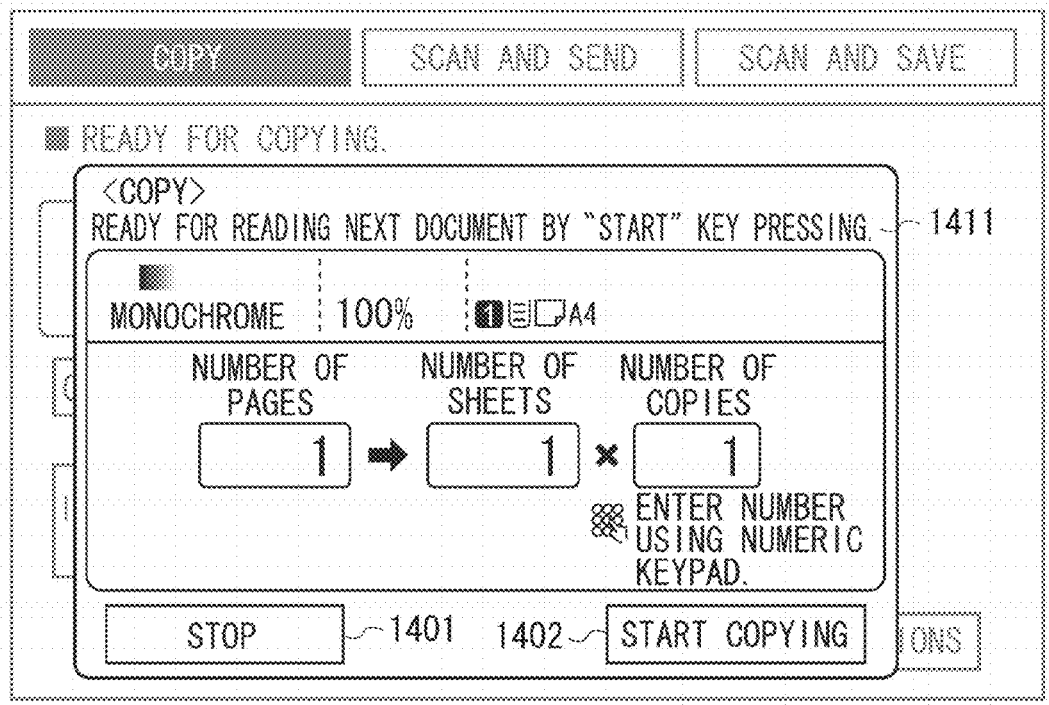
FIGS. 14A, 14B, 14C, and 14D are diagrams each illustrating an operation screen of the MFP in the exemplary embodiment of the present invention.

A case where the copy job is designated will be described. FIG. 14A illustrates an example of the continuation confirmation window displayed to the user in step S1205.

In the example illustrated in FIG. 14A, "STOP" is provided as an operation key 1401, and "START COPYING" is provided as an operation key 1402. Further, information 1411 notifies the user that reading of the next document can be started by pressing of the start key provided as a hard key outside the screen. In a case where the user desires reading of the next document, the user sets a new document on the document positioning plate 200. Specifically, the user uncovers the document positioning plate 200 by opening the document-positioning-plate cover 219, and then replaces the document set between the document-positioning-plate cover 219 and the document positioning plate 200 with the new document. Finally, the user closes the document-positioning-plate cover 219.

The description will continue with reference again to FIG. 12. Upon display of the continuation confirmation window in step S1205, the operation proceeds to step S1206. In step S1206, the CPU 111 determines whether an instruction to read the next document is issued. In a case where an event notifying that the start key has been pressed is received, the CPU 111 determines that an instruction to read the next document is issued (YES in step S1206), and returns to step S1204 to start reading the next document. In a case where no event notifying that the start key has been pressed (NO in step S1206) is received, the operation proceeds to step S1207.

In step S1207, the CPU 111 determines whether an instruction to start copying is issued. In a case where a touch event notifying that the operation key 1402 has been pressed is received, the CPU 111 determines that an instruction to start copying is issued (YES in step S1207), and ends the reading of the document. The operation then proceeds to the processing of waiting for uncovering of the document positioning plate 200 in step S507 to step S509 of FIG. 5.

Figure 14B:
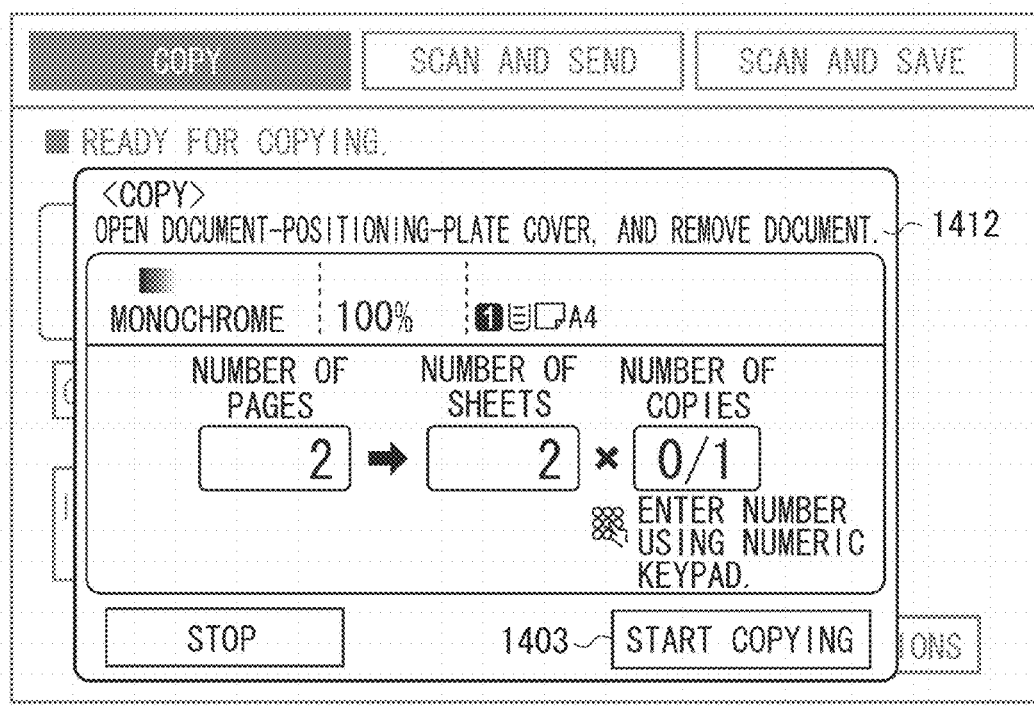

FIG. 14B illustrates an example of a display window displayed to the user in step S507. Information 1412 prompts the user to remove the document by opening the document-positioning-plate cover 219. An operation key 1403 is similar to the operation key 1402, but is grayed out to notify the user that the "START COPYING" key has already been pressed. In a case where receiving a touch event notifying the user that the operation key 1403 has been pressed, the CPU 111 may display information indicating, for example, "printing starts after the document is removed by opening the document-positioning-plate cover", in place of the information 1412.

On the other hand, in a case where no touch event notifying the user that the operation key 1402 has been pressed is received (NO in step S1207), the operation proceeds to step S1208.

In step S1208, the CPU 111 determines whether an instruction to stop sending is issued. In a case where the CPU 111 determines that a touch event notifying that the operation key 1401 has been pressed is received (YES in step S1208), the operation proceeds to step S1209 to stop the currently executed send job. In step S1209, the CPU 111 stops reading the document and stops executing the job. In response to processing of reading the image data being stopped, the output setting window illustrated in FIG. 3 is displayed and the operation state transitions to a state of waiting for new output processing. On the other hand, in a case where no touch event notifying that the operation key 1401 has been pressed is received (NO in step S1208), the operation returns to step S1206 to keep waiting for an instruction from the user.

Figure 14C:
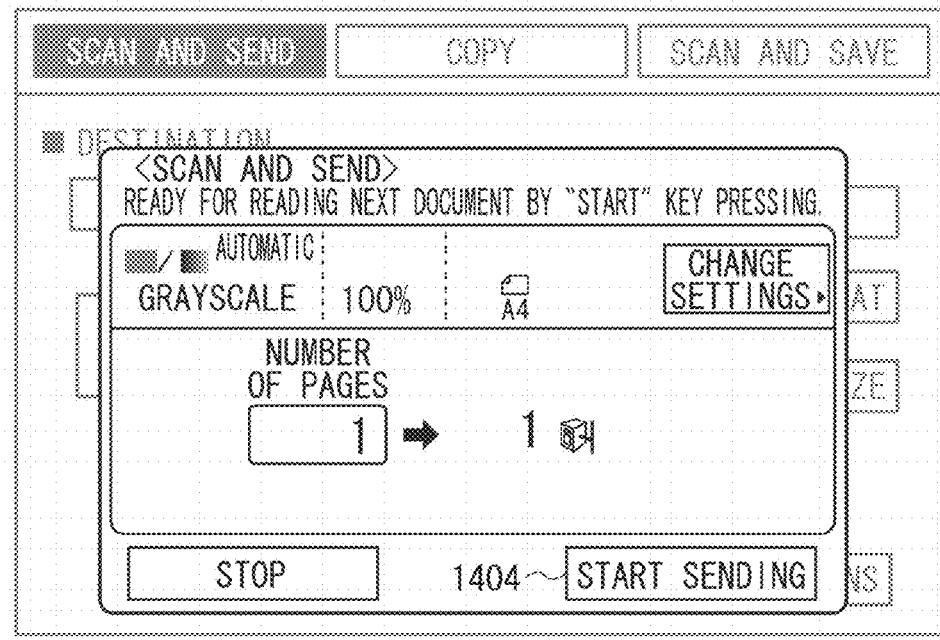

A case where the send job is designated will be described. FIG. 14C illustrates an example of the continuation confirmation window displayed to the user in step S1205, and illustrates "START SENDING" provided as an operation key 1404, as an example.

In step S1206 to step S1209, the CPU 111 waits until receiving any of an instruction to read the next document, an instruction to execute the sending processing, and an instruction to stop execution of the send job. Upon receipt of an instruction to execute the sending processing, the operation proceeds to the processing of awaiting for uncovering of the document positioning plate 200 in step S507 to step S509 of FIG. 5.

Figure 14D:
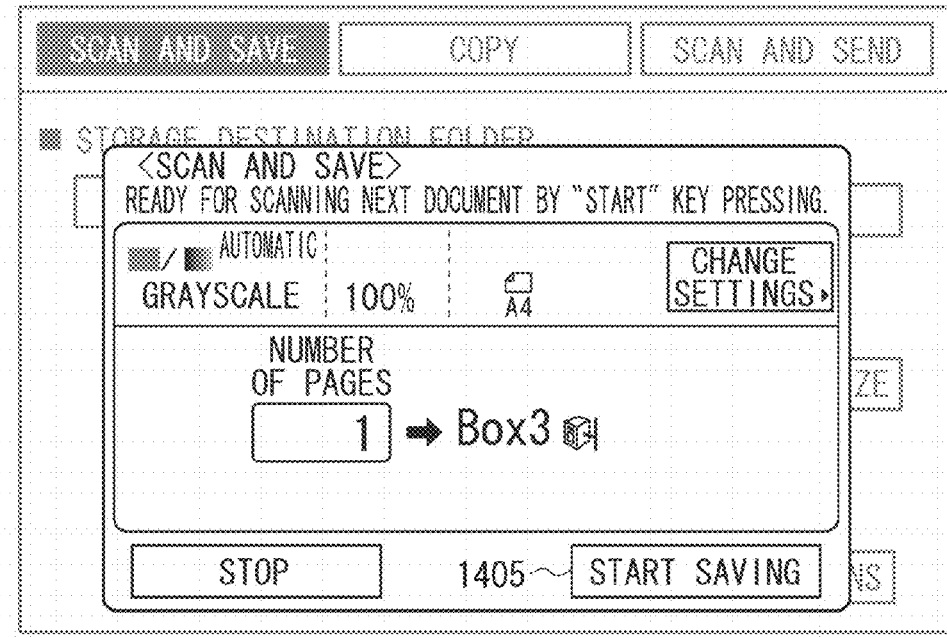

A case where the save job is designated will be described. FIG. 14D illustrates an example of the continuation confirmation window displayed to the user in step S1205, and illustrates "START SAVING" provided as an operation key 1405, as an example.

In step S1206 to step S1209, the CPU 111 waits until receiving any of an instruction to read the next document, an instruction to execute the saving processing, and an instruction to stop execution of the save job. Upon receipt of an instruction to execute the saving processing, the operation proceeds to the processing of awaiting for uncovering of the document positioning plate 200 in step S507 to step S509 of FIG. 5. The "START SENDING" key exemplifying the operation key 1404 and the "START SAVING" key exemplifying the operation key 1405 are also grayed out to display the user that these keys have already been pressed.

As described above, according to the present exemplary embodiment, in a case where a plurality of sheets of document is read from the document positioning plate 200, the CPU 111 does not execute the output processing even if the document positioning plate 200 is uncovered after a sheet of document set on the document positioning plate 200 is read. However, in a case where an instruction to execute the output processing is received from the user, the CPU 111 waits until the document positioning plate is uncovered. Therefore, the document can be prevented from being left behind.

According to the present exemplary embodiment, the ID-card copy function has been described. This function is provided to read the front side and the back side of an ID card, and to print image data obtained by this reading on one sheet. However, this reading of an ID card is also applicable to the send job and the save job. In such a case, for example, image data of one page may be generated by reading the front side and the back side of an ID card, and the generated image data may be sent or saved.

Further, according to the present exemplary embodiment, the processing conditions illustrated in FIG. 6 have been described as examples of the predetermined function, but these are not limitative. For example, in addition to these processing conditions, sending may be disabled until the document positioning plate is uncovered in facsimile transmission as well, or sending may be disabled until the document positioning plate is uncovered only in ID-card reading. Furthermore, an administrator of the MFP 101 may be allowed to set whether to perform the processing for preventing a document from being left behind, for each function.

According to the present invention, leaving behind a document can be appropriately prevented according to whether predetermined setting is made. This mechanism can prevent a document from being left behind, without reducing convenience of a user.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-091808 filed Apr. 25, 2014, which is hereby incorporated by reference herein in its entirety.

What is claimed is:

1. A copier comprising:
   a document cover;
   a reading unit configured to read an image;
   a printing unit configured to print the image; and
   a setting unit configured to set an identification card mode for reading a front side and a back side of an identification card and then printing an image of the front side and an image of the back side,
   wherein the printing unit starts, in a case where the identification card mode is set by the setting unit, printing of the image of the front side and the image of the back side in accordance with open of the document cover after the reading unit reads the front side and the back side of the identification card, and
   wherein the printing unit starts, in a case where the identification card mode is not set by the setting unit, printing of an image without waiting open of the document cover after reading by the reading unit.

2. The copier according to claim 1, further comprising:
   a detection unit configured to detect opening and closing of the document cover.

3. The copier according to claim 1, wherein the printing unit starts, in a case where the identification card mode is not set by the setting unit, printing of the image of the front side and the image of the back side in accordance with completion of reading the back side of the identification card.

4. The copier according to claim 1, further comprising:
   a conveying unit configured to covey a document,
   wherein the reading unit further reads the document conveyed by the conveying unit.

5. A control method for controlling a copier including a document cover, a reading unit configured to read an image, and a printing unit configured to print the image, the control method comprising:
   setting an identification card mode for reading a front side and a back side of an identification card and then printing an image of the front side and an image of the back side;
   starting, in a case where the identification card mode is set, printing of the image of the front side and the image of the back side in accordance with open of the document cover after the reading unit reads the front side and the back side of the identification card; and
   starting, in a case where the identification card mode is not set, printing of an image without waiting open of the document cover after reading by the reading unit.

6. A non-transitory computer-readable storage medium storing a computer program for controlling a computer to execute respective steps in a control method for controlling a copier, the computer program comprising:
   code to set an identification card mode for reading a front side and a back side of an identification card and then printing an image of the front side and an image of the back side;
   code to start, in a case where the identification card mode is set, printing of the image of the front side and the image of the back side in accordance with open of the document cover after the reading unit reads the front side and the back side of the identification card; and
   code to start, in a case where the identification card mode is not set, printing of an image without waiting open of the document cover after reading by the reading unit.

* * * * *